(12) United States Patent
Ostromoukhov et al.

(10) Patent No.: US 7,054,038 B1
(45) Date of Patent: May 30, 2006

(54) METHOD AND APPARATUS FOR GENERATING DIGITAL HALFTONE IMAGES BY MULTI COLOR DITHERING

(75) Inventors: Victor Ostromoukhov, Lausanne (CH); Roger D. Hersch, Epalinges (CH)

(73) Assignee: Ecole polytechnique fédérale de Lausanne (EPFL), Lausanne (CH)

( * ) Notice: Subject to any disclaimer, the term of this patent is extended or adjusted under 35 U.S.C. 154(b) by 0 days.

(21) Appl. No.: 09/477,544

(22) Filed: Jan. 4, 2000

(51) Int. Cl.
*H04N 1/40* (2006.01)
(52) U.S. Cl. .................................. 358/3.13; 358/3.16
(58) Field of Classification Search ...... 358/3.13–3.18, 358/1.9, 500, 521, 515–518, 3.19–3.2
See application file for complete search history.

(56) References Cited

U.S. PATENT DOCUMENTS

| | | | |
|---|---|---|---|
| 4,812,899 A | | 3/1989 | Kueppers |
| 4,837,613 A | | 6/1989 | Paxton et al. |
| 5,070,413 A | | 12/1991 | Sullivan et al. |
| 5,485,558 A | | 1/1996 | Weise et al. |
| 5,982,924 A | * | 11/1999 | Power et al. ............... 382/162 |
| 6,008,796 A | * | 12/1999 | Vaswani et al. ............ 345/442 |
| 6,501,564 B1 | * | 12/2002 | Schramm et al. ............ 358/1.9 |

OTHER PUBLICATIONS

J.D. Boissonat, M. Teillaud, "A Hierarchical Representation of Objects: The Delaunay tree", Proceedings of the 2nd annual ACM Symposium on Computational Geometry, Yorktown Heights, NY, Jun. 2-4, 1986, pp. 260-268.

J. Gereadts and S. Lenczowski, "Océ's productive colour solution based on the Direct Imaging Technology", Proceedings of the IS&T International Conf. On Direct Imaging Technology, vol. NIP-13, 1997, pp. 728-733.

P.C. Hung, Colorimetric calibration in electronic imaging devices using a look-up-table model and interpolations, Journal of Electronic Imaging vol. 2, No. 1, pp. 53-61, Jan. 1993.

V. Ostromoukhov, R.D. Hersch, Multi-Color and Artistic Dithering, Proceedings Siggraph'99, ACM Computer Graphics Proceedings, Annual Conference Series, 1999, 425-432.

* cited by examiner

*Primary Examiner*—Thomas D. Lee
*Assistant Examiner*—Stephen Brinich

(57) ABSTRACT

The invention provides a method and apparatus for the reproduction of color images by multi-color dithering. Multi-color dithering is an extension of bi-level dithering for halftoning an input image using as primary colors an arbitrary number of inks. The inks may comprise standard inks or non-standard inks such as non-process color inks, opaque inks, metallic inks, variable color inks and fluorescent inks. Multi-color dithering provides a solution for creating artistic multi-color dithered images, whose screen elements are made of artistic color screen shapes such as micro-letters, symbols and ornaments. When printed at high resolution and at high registration accuracy, multi-color dithering using large dither arrays incorporating artistic dither shapes provides an effective solution for preventing counterfeiting. The use of non-standard inks offers additional protection. Multi-color dithering also offers a solution for printers requiring that all inks are printed side by side, without overlaps.

16 Claims, 27 Drawing Sheets

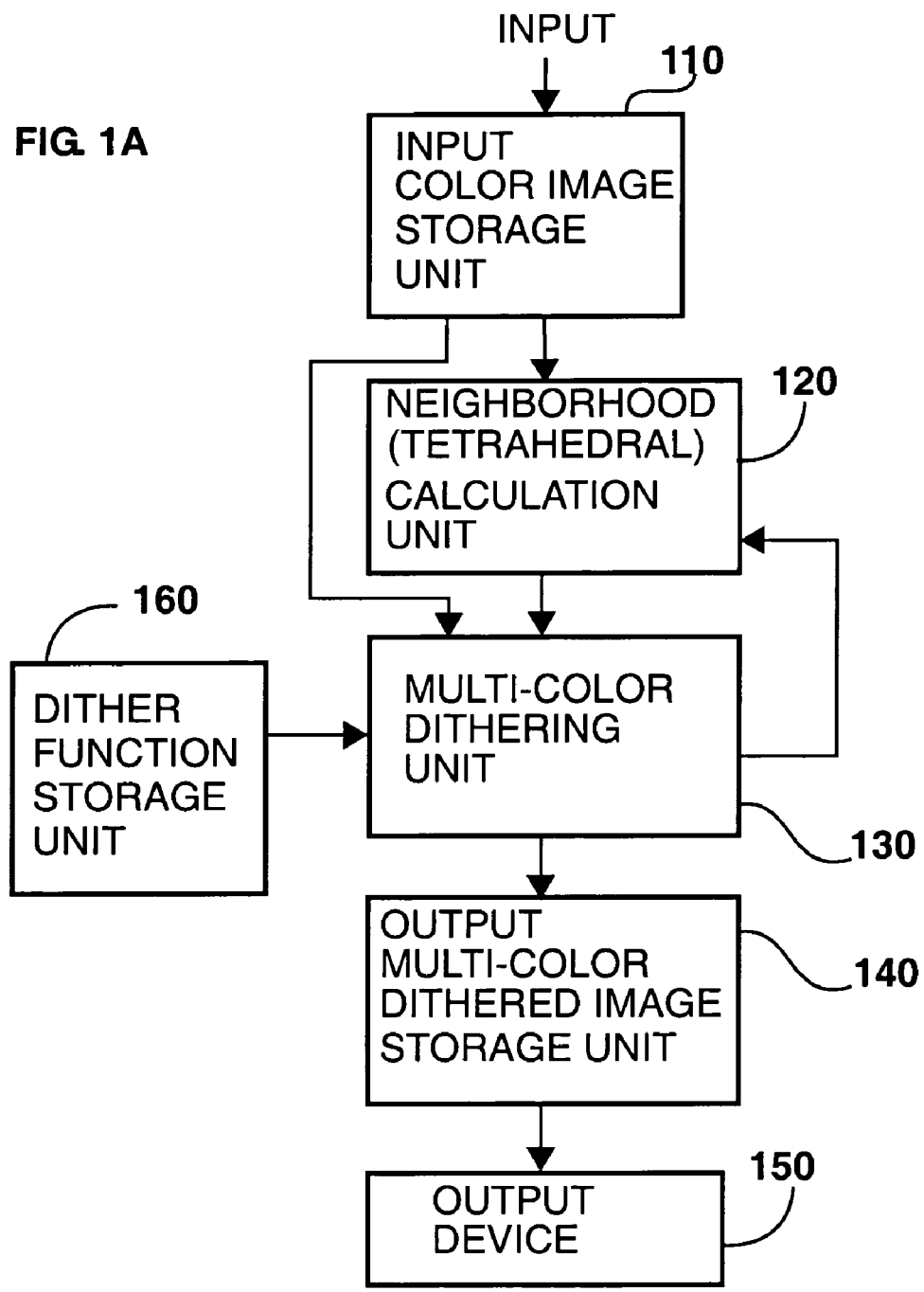
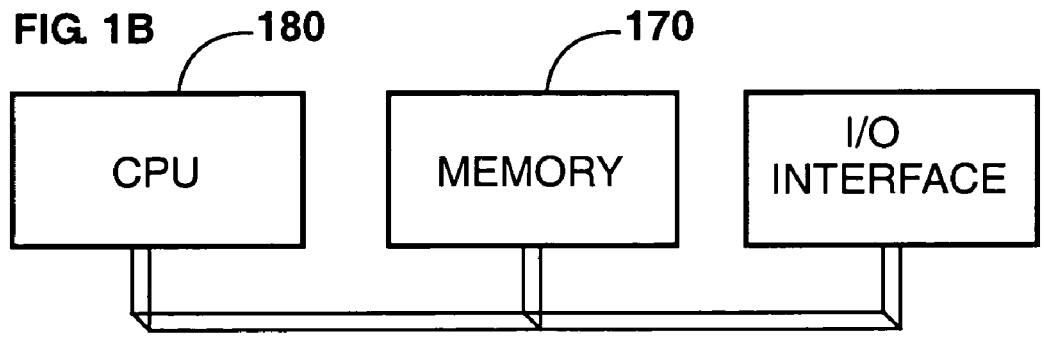

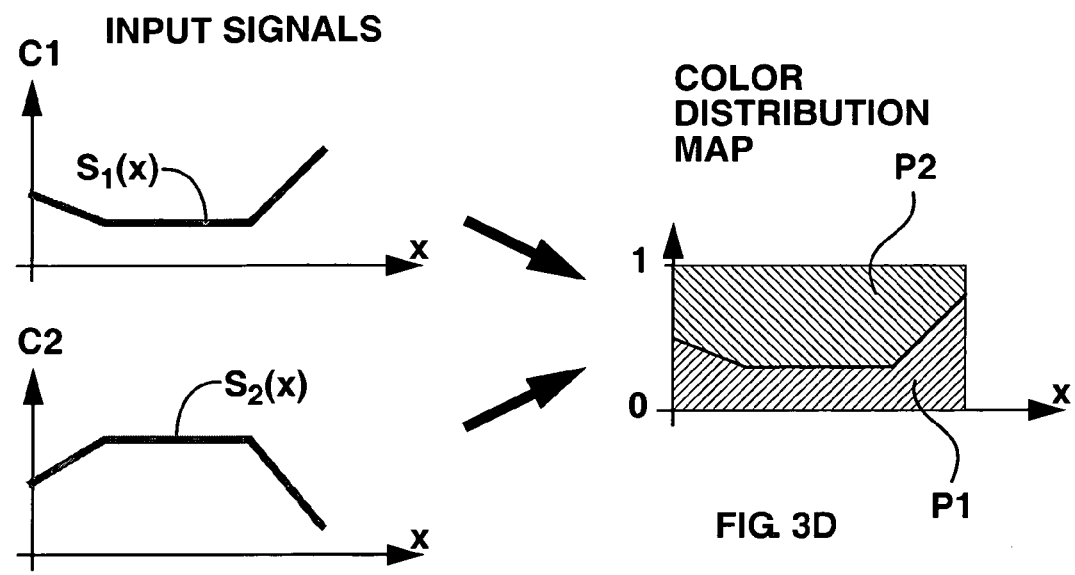
FIG. 3A
FIG. 3D
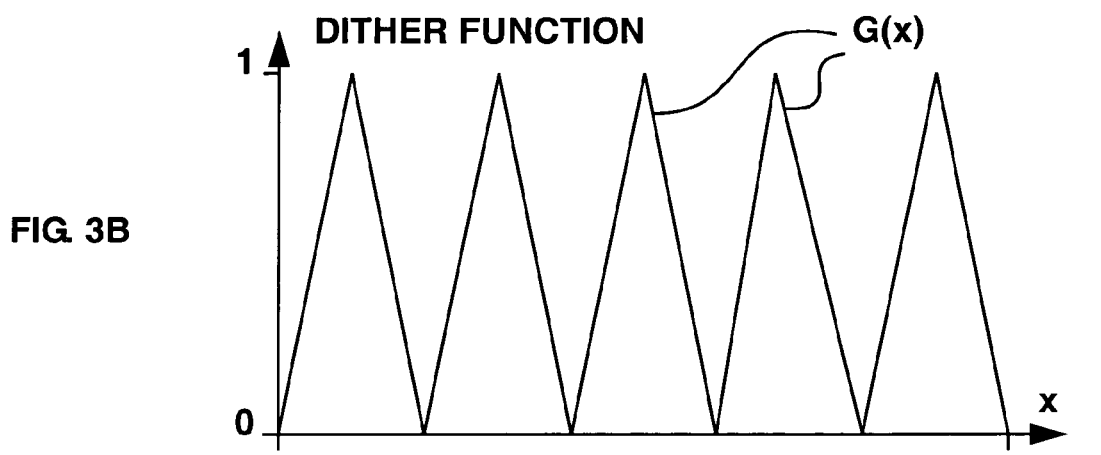
FIG. 3B
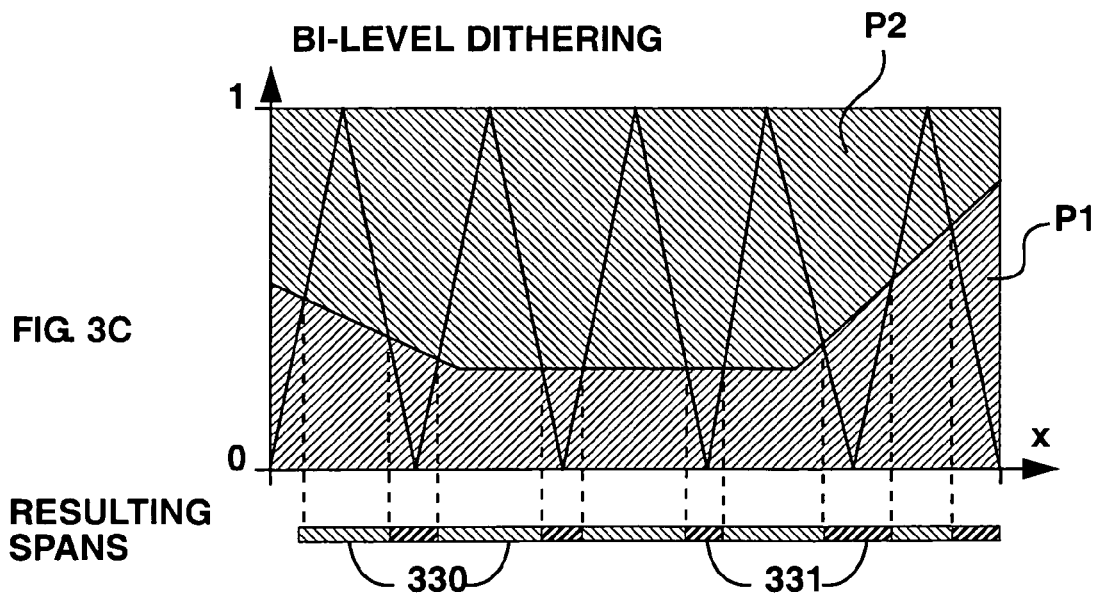
FIG. 3C

Basic Tile Area = 32
Normalization Coefficient = 1/32

**Basic Tile Area = 17
Normalization Coefficient = 1/17**

Basic Tile Area = 25
Normalization Coefficient = 1/25

Basic Tile Area = 25
Normalization Coefficient = 1/25

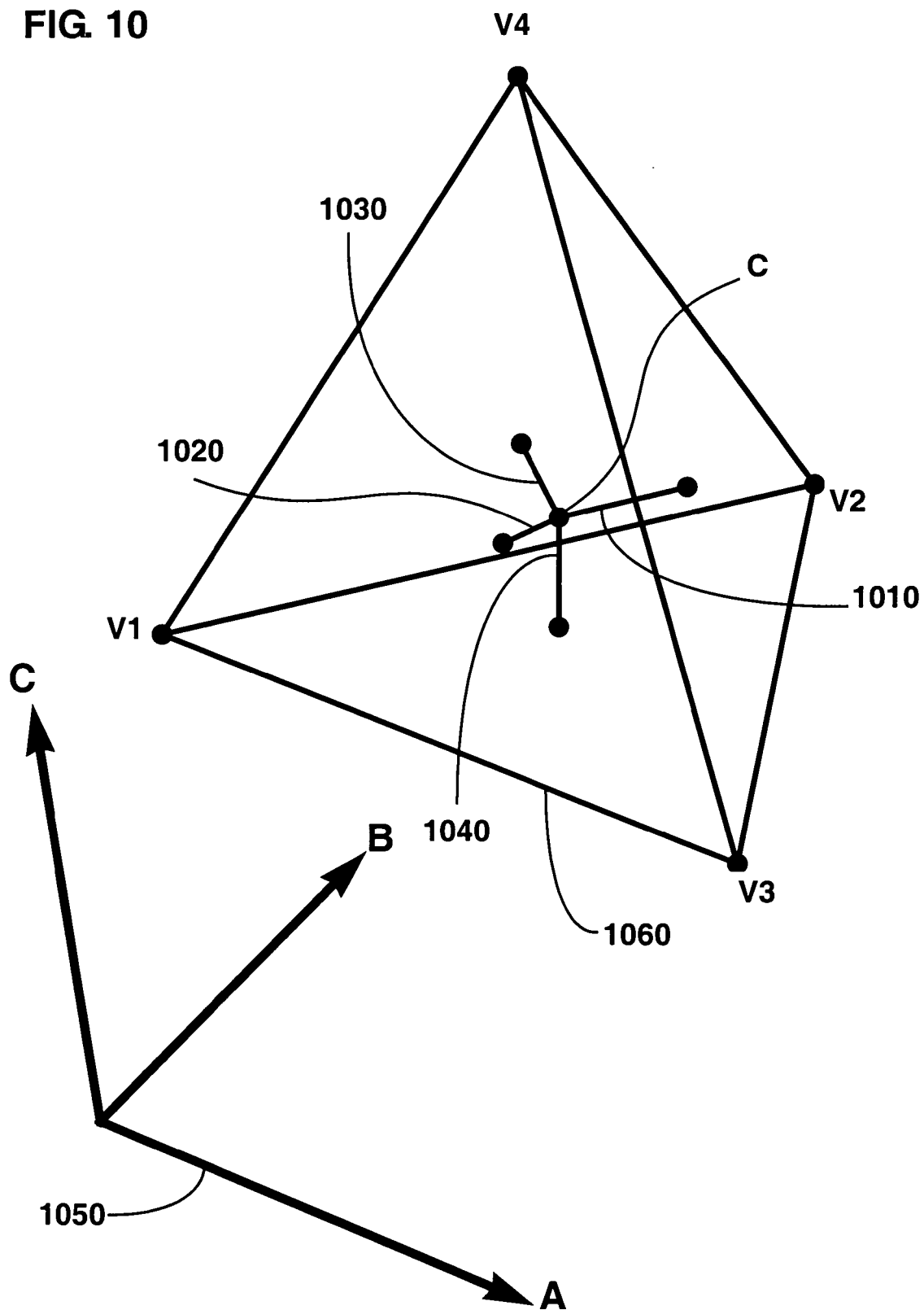

FIG. 13 MAGENTA LAYER (M)

FIG. 14 YELLOW LAYER (Y)

FIG. 15 RED LAYER (R)

FIG. 16  GREEN LAYER (G)

FIG. 17 BLACK LAYER (K)

FIG. 18  WHITE LAYER (W)

FIG. 20  BROWN-GOLD LAYER (D)

FIG. 21  MAGENTA LAYER (M)

FIG. 22  YELLOW LAYER (Y)

FIG. 23 RED LAYER (R)

FIG. 24 GREEN LAYER (G)

FIG. 25  BLACK LAYER (K)

FIG. 26  WHITE LAYER (W)

METHOD AND APPARATUS FOR GENERATING DIGITAL HALFTONE IMAGES BY MULTI COLOR DITHERING

BACKGROUND OF THE INVENTION

The present invention relates generally to the field of digital image synthesis and, more particularly to digital color image reproduction, digital color image printing, digital color image display and anti-counterfeiting protection. The invented method and apparatus enable generating digital halftone images by multi-color dithering. The invented method and apparatus are particularly effective for generating images on color printers printing with more colors than cyan, magenta, yellow and black, and for generating images incorporating microstucture patterns (micro-characters, symbols and ornaments) made of a combination of standard and non-standard inks. Non-standard inks comprise non-process colors, opaque inks, and special inks such as metallic ink, variable color inks and fluorescent inks. The generated images are displayed on color displays or printed on physical output devices such as ink-jet printers, electrophotographic printers, offset printers or gravure printers.

The reproduction of color images requires in the general case (1) separating the image colors (for example red, green and blue) into the set of available printable colors (for example cyan, magenta, yellow and black), (2) halftoning each of the printable color layers and (3) printing the halftoned image or visualizing it on a display device.

Most existing color halftoning techniques are based on the independent halftoning of each of the contributing color layers. In offset and in many electrographic printers, the color halftone layers are generated independently at angles of 15, 45, 75 degrees in order to avoid interferences between the cyan, magenta and black layers. Ink-jet printers often use error-diffusion to halftone each of the color layers independently.

Existing approaches for color separation with non-standard inks consider that color layers can be printed independently from one another. This is true as long as the inks are transparent and as long as the dots of each screen are randomly positioned with respect to the dots of the other screens, as assumed by the Neugebauer equations (see G. L. Rogers, "Neugebauer Revisited: Random Dots in Halftone Screening", Color Research and Applications, Vol. 23, No. 2, pages 104–113, 1998).

If these assumptions are not true, halftoning each of the color layers independently may generate color shifts depending on the amount of superposition between screen dots of individual halftone layers. As long as the inks are transparent, the color shifts are small and the reproduction fidelity can be ensured by calibrating the printing device (see H. R. Kang, Color Technology for Electronic Imaging Devices, SPIE Publication, 1997, chapter 12).

Some applications however require that different inks be always printed side by side without overlapping. This is the case, for example, when printing with opaque inks as taught by inventor H. Kueppers in U.S. Pat. No. 4,812,899, issued Mar. 14, 1989. Different inks must also be printed side by side for some printing devices as taught by J. Gereadts and S. Lenczowski, "Océ's productive colour solution based on the Direct Imaging Technology", Proceedings of the IS&T International Conf. On Direct Imaging Technology, Vol. NIP-13, 1997, pages 728–733.

Manufacturers of valuable documents, such as banknotes, identity cards and checks make often use of the high registration accuracy of their original printing equipment to create a graphic design which is both visually pleasant and difficult to imitate using standard printing processes (see Rudolf L. VanRenesse, Optical Document Security, Artech House 1998, chapter 6). In addition, they may use non-standard inks (sometimes also called custom inks), i.e. inks which have a color different from process colors Cyan, Magenta, Yellow and Black to reproduce images and graphic designs. Similar anti-counterfeiting techniques are used to print commercial packages which need to be protected against illegal counterfeits (drugs, cosmetics, etc.).

One prior art method of generating a dither pattern for an RGB value, is taught by D. N. Weise and H. Gunter Zieber in U.S. Pat. No. 5,485,558, issued Jan. 16, 1996. That method is limited to applications, mainly display applications, where one can associate to each input color pixel a dither array, for example an 8×8 array, in order to reproduce that color pixel. Since the dither array must remain of small size, that method does not allow to create at the screening layer artistic screen shapes. Another prior art method of color halftoning is to use vector error-diffusion in color space, as taught by J. Sullivan and R. L. Miller in U.S. Pat. No. 5,070,413, issued Dec. 3, 1991. However, error-diffusion has the drawback of inducing considerable dot gain, compared with clustered dot dithering methods. In addition, error-diffusion does not allow to create user-defined screen shapes.

The present invention discloses a new multi-color dithering method which automatically enforces side by side printing of several color and/or metallic ink layers. Thanks to a user definable dither function or dither array of freely chosen size, multi-color dithered images may incorporate identifyable screen shapes, for example artistic screen shapes, which can be used for document authentication. Combined with color separation by tetrahedral interpolation, multi-color dithering enables printing images made of non-standard inks.

The invented method is a non-trivial generalization of ordered dither halftoning, which uses spatial dithering in order to obtain clustered-dot or dispersed-dot binary patterns on output devices (see H. R. Kang, Digital Color Halftoning, SPIE Press/IEEE Press, 1999, chapters 13 and 14).

SUMMARY OF THE INVENTION

The present invention provides a method and apparatus and a preferred implementation as a computing system for the reproduction of color images by a new method that will be called hereinafter "multi-color dithering". Multi-color dithering is characterized by the use of a two-dimensional dither function and the use of an arbitrary number of inks and superposition of inks as primary colors. The inks may comprise standard inks and non-standard inks such as non-process colors, opaque inks, metallic inks and variable color inks. Multi-color dithering provides a solution for printing color images with a freely chosen set of standard or non-standard inks. It also provides a solution for creating artistic multi-color dithered images incorporating a microstructure made of artistic color screen shapes such as micro-letters, symbols and ornaments. When printed at high resolution and at high registration accuracy, multi-color dithering using large dither arrays incorporating artistic dither shapes provides an effective solution for preventing counterfeiting. The use of non-standard inks offers additional protection. Multi-color dithering offers also a solution for printers requiring that all inks are printed side by side, without overlaps.

The invented method comprises the steps of (1) defining a two dimensional dither function $G(x,y)$; (2) choosing a set of primary colors {$C_i$} located within a three-dimensional color working space ABC, where ABC stands for RGB, CIE-XYZ, CIE-LAB or any other color space; (3) initiating a neighbor finding procedure which renders neighboring primary colors {$C_j$} of a given input color C in the three-dimensional color space ABC; (4) computing the primary color of each output image pixel O(x,y) by a set of substeps; and (5) outputting the resulting color output image on a printing or a display device. To define a two-dimensional dither function, one may either build it or take an existing two-dimensional dither function, often implemented as a dither array or a dither matrix. The substeps for computing the primary color of each output image pixel O(x,y) comprise (1) locating in the input color image an input color location (x',y') and computing its corresponding color C(x', y'); (2) finding the N neighbor primary colors {$C_j$} of C(x',y') in the ABC color space by using the neighbor finding procedure; (3) computing the amount $S_j(x,y)$ of every neighbor primary color $C_j$; (4) determining the output primary color O(x,y) at output pixel (x,y) by determining at each position (x,y) the partition $P_j(x,y)$ within which the dither function G(x,y) is situated; and (5) by assigning neighbour primary color $C_j$ associated to partition $P_j(x,y)$ to the output pixel primary color O(x,y). Partitions $P_j$ represent at each pixel (x,y) the respective amounts $S_j(x,y)$ of neighbouring colors $C_j$.

With modern technology, a preferred embodiment of a multi-color dithering apparatus is a computing system storing in its memory an input color image, the values of a two-dimensional dither function, a neighborhood calculation software procedure, a multi-color dithering software procedure and the resulting output multi-color dithered image. Its central processing unit interacts with the computing system's memory, runs the neighborhood calculation and multi-color dithering software procedures, computes for each output multi-color image pixel an output primary color selected from a set of primary colors, stores the resulting output color-dithered image in memory and forwards it to an output device, for example a printer or a display device.

BRIEF DESCRIPTION OF THE DRAWINGS

For a better understanding of the present invention, one may refer by way of example to the accompanying drawings, in which:

FIG. 1A shows a simplified block diagram of an apparatus for generating digital halftone images according to the invented multi-color dithering method;

FIG. 1B shows a preferred embodiment of the apparatus as a computing system;

FIGS. 3A to 3D illustrate a one-dimensional two-primary-colors variant of the invented multi-color dithering method by showing two primary colors (FIG. 3A), a color distribution map made of two partitions (FIG. 3D), a dither function (FIG. 3B) and the determination of the color of the spans according to the partition within which the dither function is situated (FIG. 3C);

FIG. 10 shows a typical tetrahedron of the set of tetrahedra shown in FIG. 9B, which contains a given input color C in three-dimensional color space;

DETAILED DESCRIPTION OF THE INVENTION

Figure 9A:
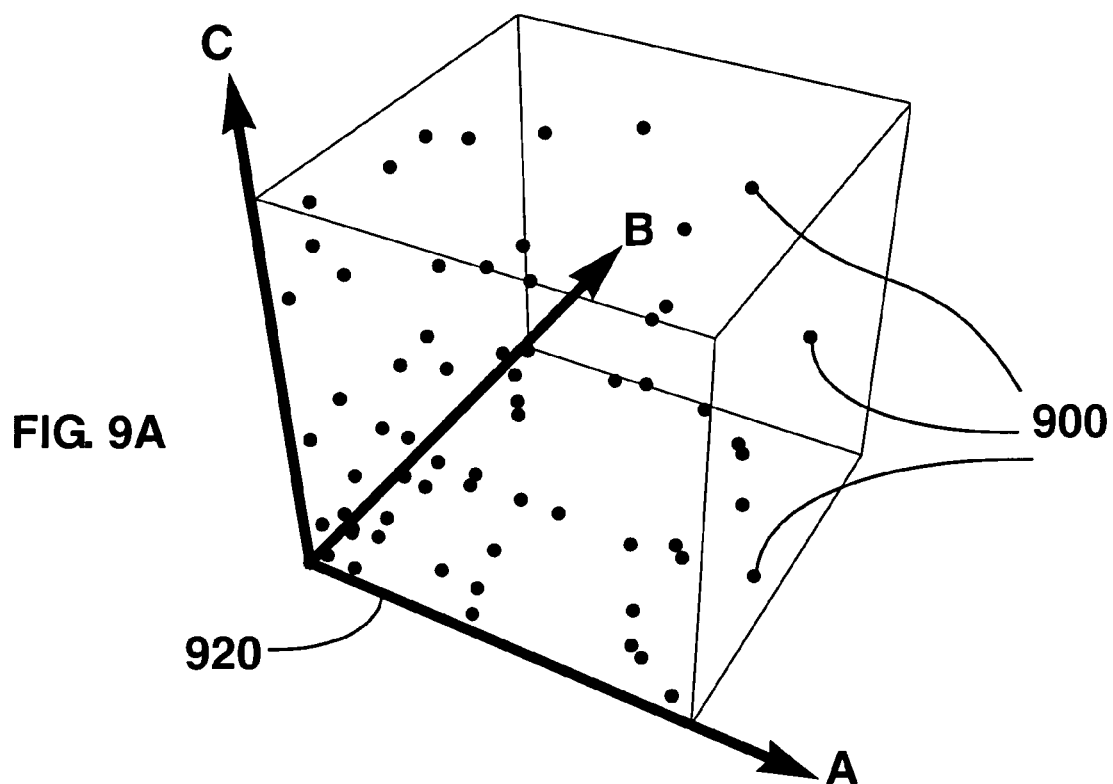
FIG. 9A shows a typical set of primary colors in a three-dimensional color space ABC.

The present invention concerns a color halftoning technique using an arbitrary set of primary colors, as shown in FIG. 9A. The set 900 of primary colors fills in a non-uniform manner a three-dimensional color space ABC. ABC stands for any convenient representation of a three-dimensional color space, such as RGB, CIE-XYZ, CIE-LAB, or any other representation known in the art.

The term "primary color" refers to a color which belongs to the set of colors available to reproduce a color image. Such colors are generally the colors of the available inks and of the allowed superpositions of two or more layers of inks in the case of transparent inks. In the case of a metallic ink, the color associated to the metallic ink is the color that is being captured when the effect of specular reflection is cancelled (for example when measured with an instrument that avoids capturing specular reflection). In the case of a variable color ink, the color associated to the variable color ink color used for multi-color dithering is one of its possible colors, i.e. the color which appears when the image is viewed at a certain desired display angle. In the case of a fluorescent ink, the color associated with the fluorescent ink is the color that is perceived or measured under normal light (for example a light source A or D65).

Prior Art Ordered Dithering

Figure 2A:
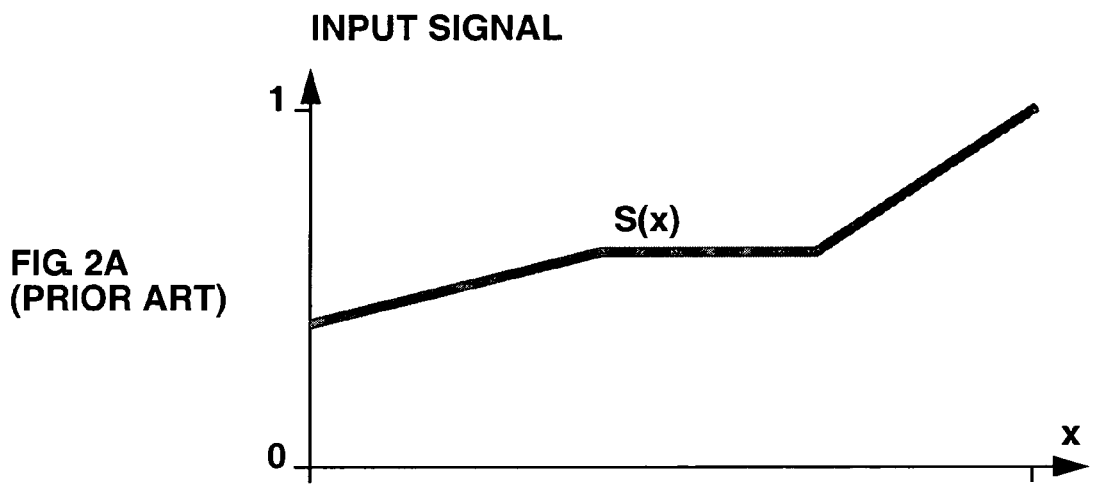
FIG. 2 shows the prior art dithering method based on the comparison (FIG. 2C) between an input signal (FIG. 2A) and a dither threshold function (FIG. 2B)
Figure 2B:
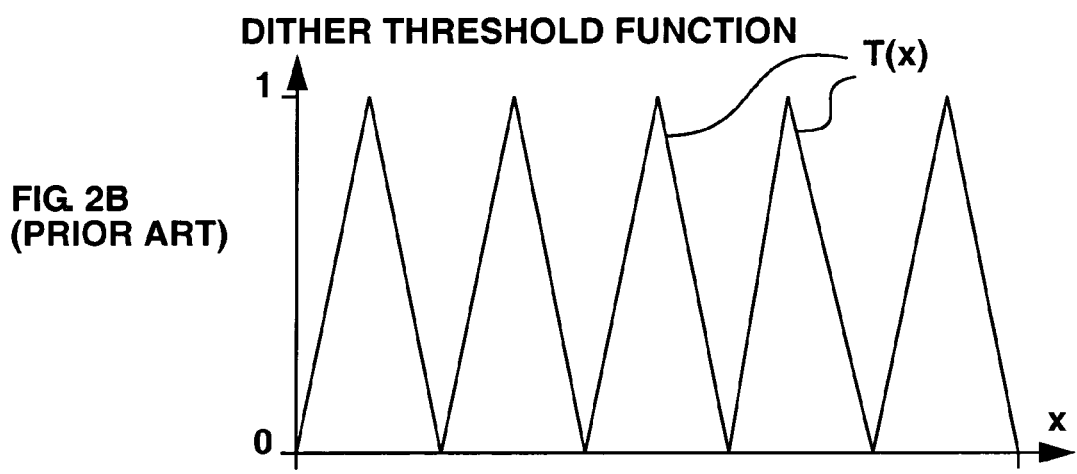
Figure 2C:
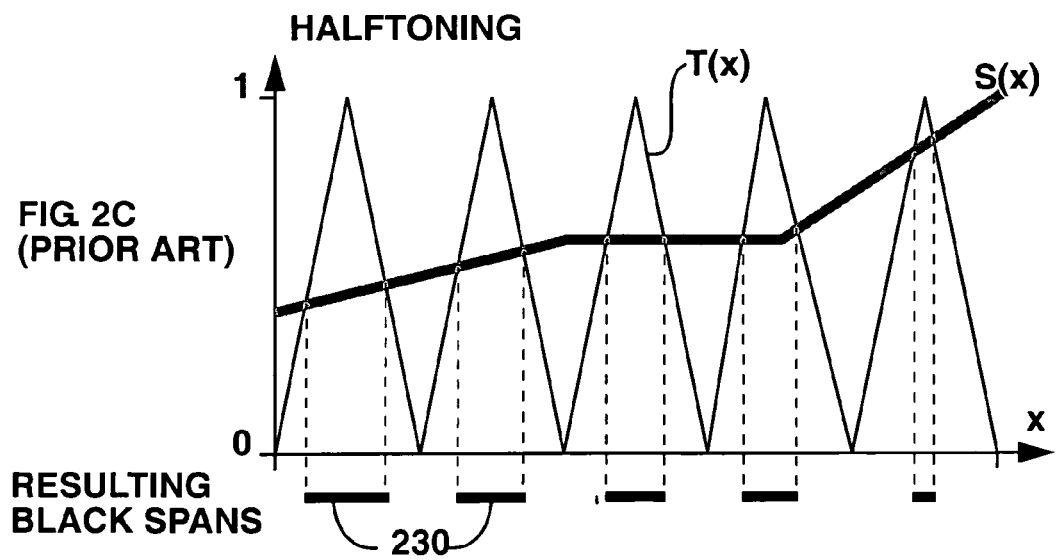

The ordered dither method known in the prior art is clearly illustrated for the one-dimensional case by FIGS. 2A, 2B and 2C. FIG. 2A shows a one-dimensional input signal $S(x)$ in the range [0 . . . 1]. The input signal $S(x)$ is compared with a dither threshold function (also called dither function) $T(x)$ shown in FIG. 2B. A set of black spans 230 is generated for coordinates x where $S(x)<T(x)$, as shown in FIG. 2C. These black spans represent the inked areas obtained by dithering the input signal. This method is only based on the comparison of the input signal value with the dither threshold value. This method is conceptually simple and computationally efficient.

Figure 5:
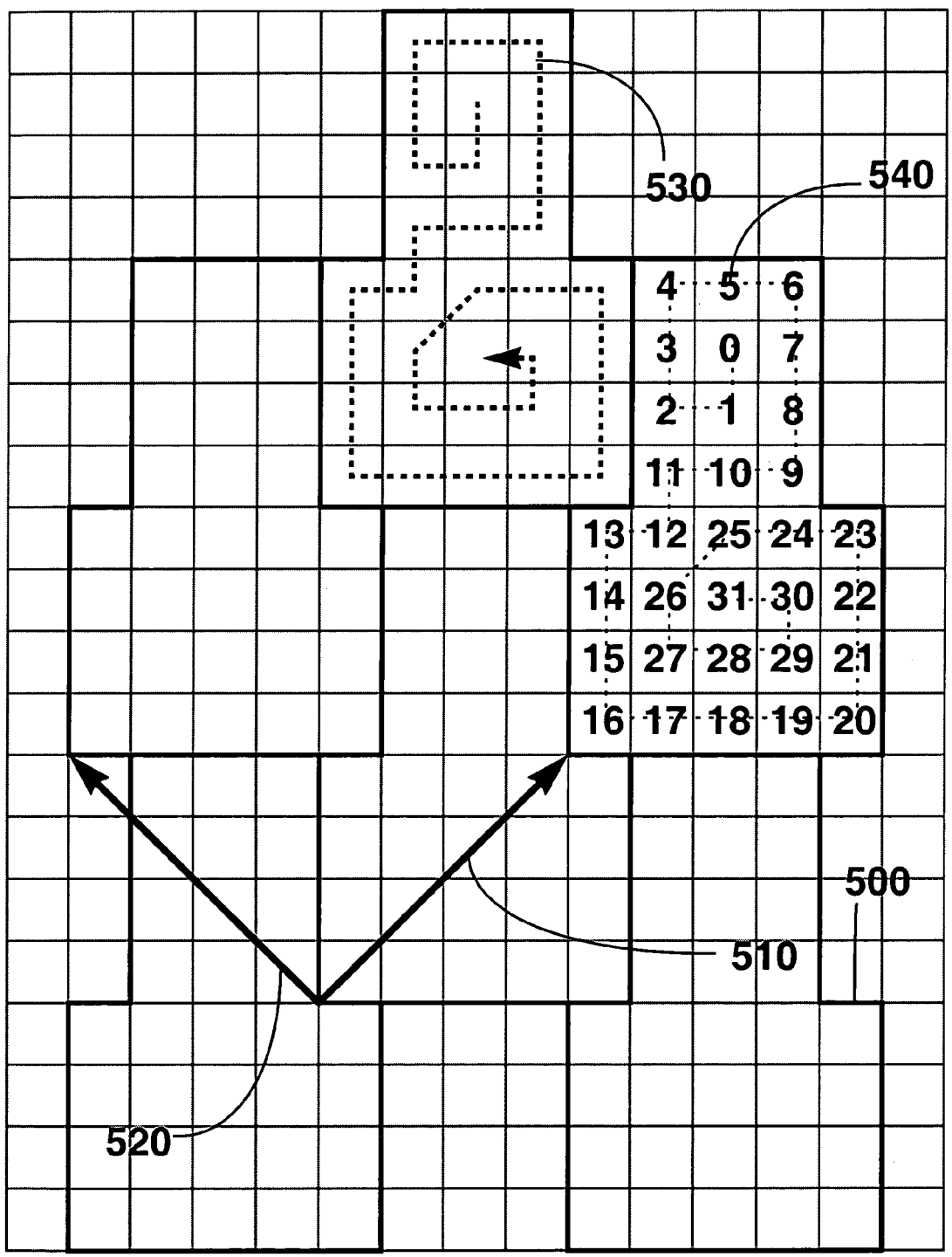
FIG. 5 (prior art) shows the construction of a traditional two-dimensional dither tile which paves the plane, where the tiling is characterized by two basic translation vectors and by a discrete set of dither threshold values.

In the prior art two-dimensional case (see FIG. 5), a two-dimensional dither threshold function $T(x,y)$ (also called two-dimensional dither function or spot function) is provided. In most cases, the two-dimensional dither threshold function $T(x,y)$ is a discrete dither function with dither threshold values 540 associated to the elementary cells of the dither tile 500 paving the plane (see FIG. 5). The tiling is usually characterized by two basic translation vectors 510 and 520. A dither tile represents the spatial extent of one period of a repetitive discrete dither function. A simple and straightforward way of generating the set of dither threshold values 540 consists in constructing the double spiral path 530 which fills the dither tile 500, as shown in FIG. 5. The values of the basic dither tile are generated by simply increasing the ordinal number along the path 530. The generated ordinal numbers are normalized by a normalization coefficient of value 1/S, where S is the area of the dither tile (number of individual elementary cells). Such a spiral path is responsible for the clustered appearance of both the white and the black areas of the halftoned image.

An alternative prior art method of creating a discrete dither function (also called dither array) is to sample a continuous dither function at each dither tile cell and to replace successive sample values by successive ordinal numbers in the range [0 . . . S−1], where S is the number of elementary cells in the dither tile (or dither array). Again, the generated ordinal numbers are normalized by a normalization coefficient of value 1/S, where S is the area of the dither tile (number of individual cells). Further prior art methods of creating dither functions are described in the book written by H. R. Kang, Digital Color Halftoning, SPIE Press/IEEE Press, 1999, chapters 13 and 14.

Multi-Color Dithering

In order to explain the invented multi-color dithering menthod starting from the prior art ordered dithering method, let us first consider a one-dimensional case shown in FIGS. 3A–3D. Instead of considering the one-color input signal $S(x)$ in FIG. 2A, we consider two signals: color C1 input signal $S_1(x)$ and color C2 input signal $S_2(x)$, as shown in FIG. 3A. Color C1 can be considered to be the ink color, and color C2 the white paper color. $S_1(x)$ and $S_2(x)$ can be assumed to be the relative normalized (i.e. $S_1(x)+S_2(x)=1$) amounts of ink color and white paper color, expressed as values between 0 and 1. Functions $S_1(x)$ and $S_2(x)$ can be combined in a color distribution map made of two partitions P1 and P2 as shown in FIG. 3D. This map shows, for every coordinate x, the proportions of input color signals $S_1(x)$ and $S_2(x)$. By construction, the color distribution map splits the vertical strip of height 1 into two adjacent vertical partitions, which represent input color signals $S_1(x)$ and $S_2(x)$. In FIG. 3D, partition P1 corresponds to the input color signal $S_1(x)$ and partition P2 corresponds to the input color signal $S_2(x)$. The lower boundary of P1 is 0 and its upper boundary is $S_1(x)$. The lower boundary of P2 is $S_1(x)$ and its upper boundary is 1. Referring to FIG. 3B, a simple dither function $G(x)$ identical to the dither threshold function $T(x)$ (FIG. 2B) is provided, having the range [0 . . . 1].

The invented multi-color dithering method consists in determining for every coordinate x within which partition of the color distribution map the dither function $G(x)$ is situated (FIG. 3C):

when the dither function $G(x)$ is situated within partition P2, representing the amount of input signal $S_2(x)$ of primary color C2, spans 330 of primary color C2 are generated.

when, in turn, the dither function $G(x)$ is situated within partition P1, representing the amount of the input signal $S_1(x)$ of primary color C1, spans 331 of primary color C1 are generated.

By construction, primary colors C1 and C2 are laid out side by side, without holes or overlaps.

Figure 4A:
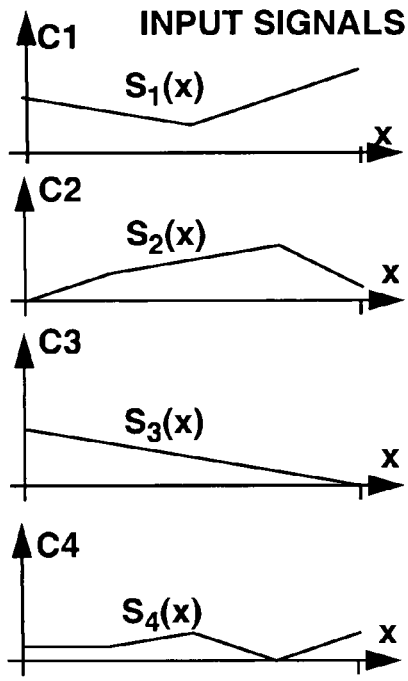
FIGS. 4A to 4C illustrate a one-dimensional four primary colors variant of the invented multi-color dithering method by showing input signals representing the amounts of primary colors (FIG. 4A), a color distribution map made of 4 partitions (FIG. 4B), and the determination of the color of the spans according to the partition within which the dither function is situated (FIG. 4C)
Figure 4B:
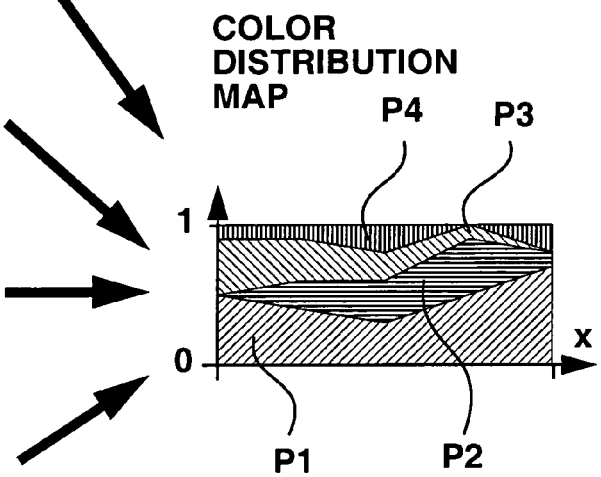
Figure 4C:
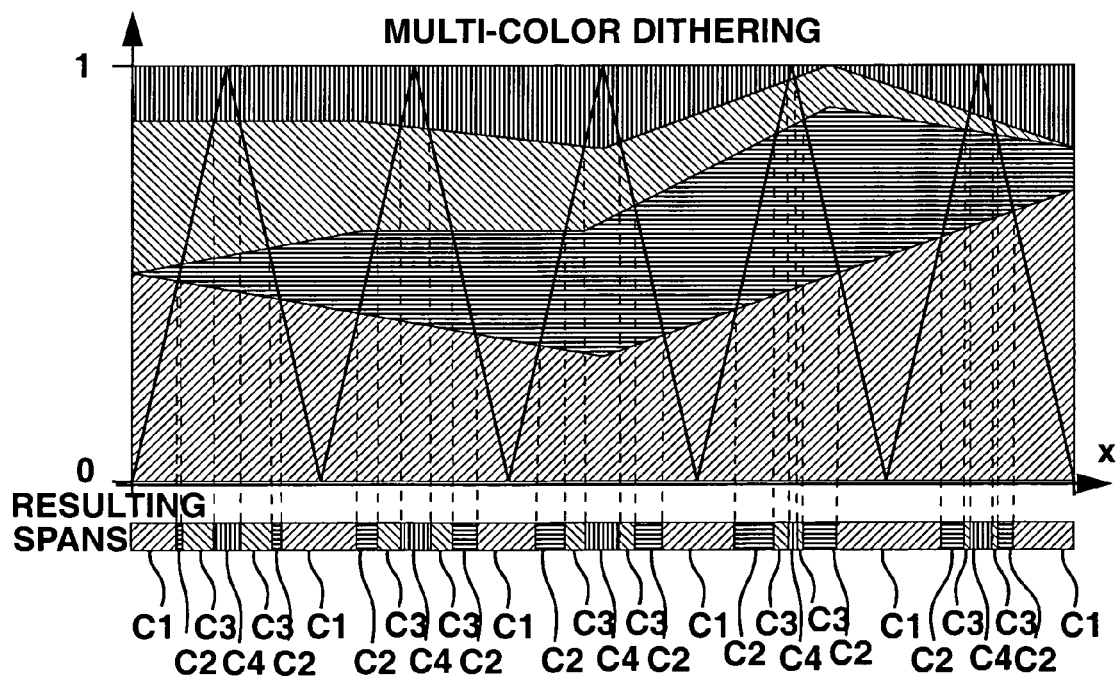

Referring now to FIG. 4, the same mechanism of determining within which partition of the color distribution map the dither function $G(x)$ is situated can be applied to the case of any number of independent input color signals. Let $S_1(x)$, $S_2(x)$, $S_3(x)$ and $S_4(x)$ be the relative norrmmalized (i.e. $S_1(x)+S_2(x)+S_3(x)+S_4(x)=1$) amounts of four color input signals of primary colors C1, C2, C3 and C4, as shown in FIG. 4A. Any of the colors C1, C2, C3 and C4 can be the white paper color (or the background color); the others are the primary colors used to halftone the image. A color distribution map shown in FIG. 4C can be created, applying the same method as in the previously described two-color case. It comprises four separate partitions which represent the amount of the four primary colors C1, C2, C3 and C4. In FIG. 4B, partition P1 represents the amount of input signal $S_1(x)$ of primary color C1. The lower boundary of P1 is 0 and its upper boundary is $S_1(x)$. Partition P2 represents the amount of input signal $S_2(x)$ of primary color C2. The lower boundary of P2 is $S_1(x)$ and its upper boundary is $S_1(x)+S_2(x)$. Partition P3 represents the amount of input signal $S_3(x)$ of primary color C3. The lower boundary of P3 is $S_1(x)+S_2(x)$ and its upper boundary is $S_1(x)+S_2(x)+S_3(x)$. Partition P4 represents the amount of input signal $S_4(x)$ of primary color C4. The lower boundary of P4 is $S_1(x)+S_2(x)+S_3(x)$ and its upper boundary is 1.

FIG. 4C shows the color dithering process for the one-dimensional four-color variant of the invented multi-color dithering method:

when the dither function $G(x)$ is situated within partition P1, representing the amount of input signal $S_1(x)$ of primary color C1, the primary color C1 is generated;

when the dither function G(x) is situated within partition P2, representing the amount of input signal $S_2(x)$ of primary color C2, the primary color C2 is generated;

when the dither function G(x) is situated within partition P3, representing the amount of input signal $S_3(x)$ of primary color C3, the primary color C3 is generated;

when the dither function G(x) is situated within partition P4, representing the amount of input signal $S_4(x)$ of primary color C4, the primary color C4 is generated.

By construction, primary colors C1, C2, C3 and C4 are laid out side by side, without holes or overlaps.

Figure 6:
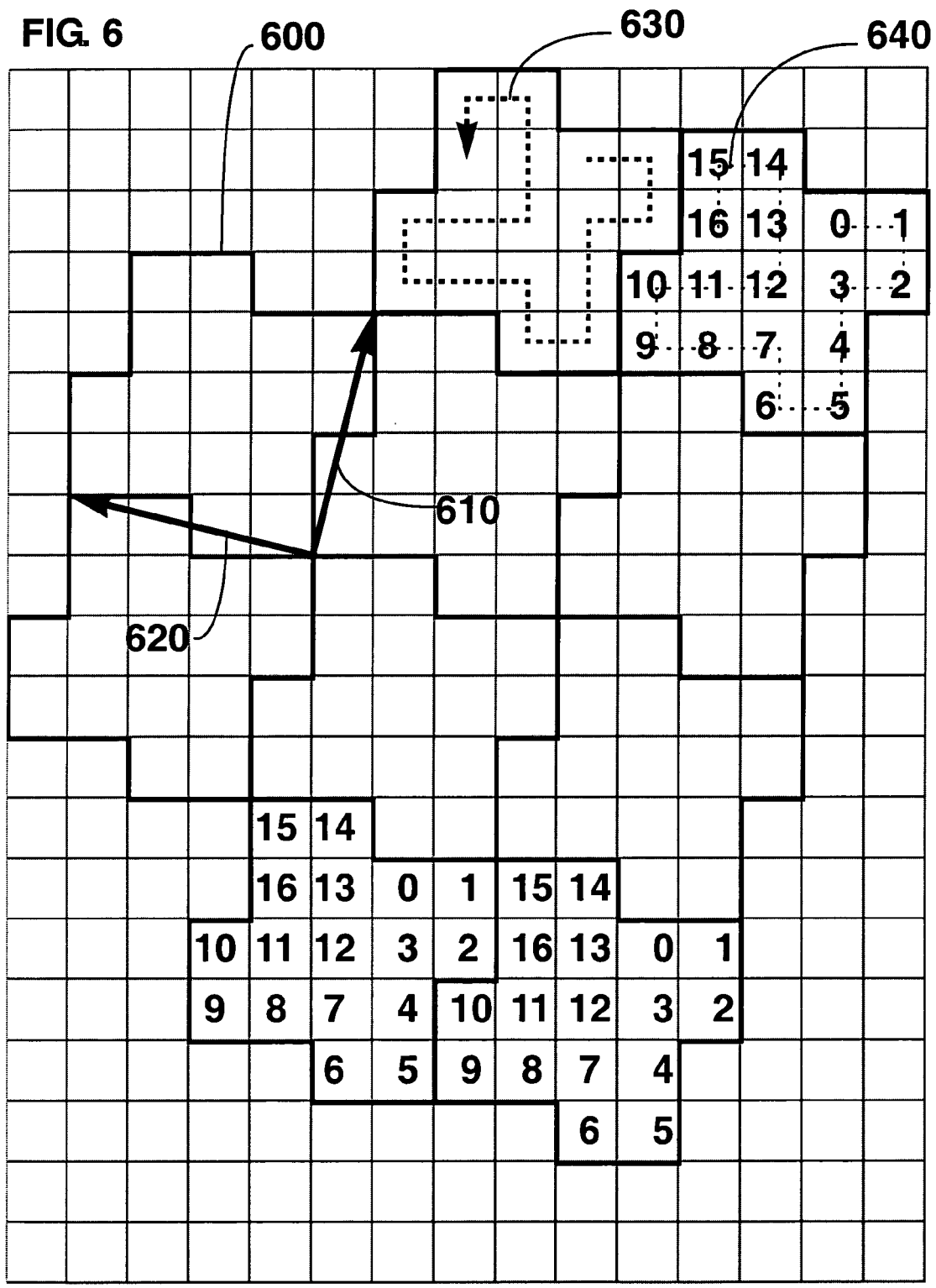
FIGS. 6 and 7 show two examples of the construction of a two-dimensional discrete dither function paving the plane and incorporating a set of dither values.
Figure 7:
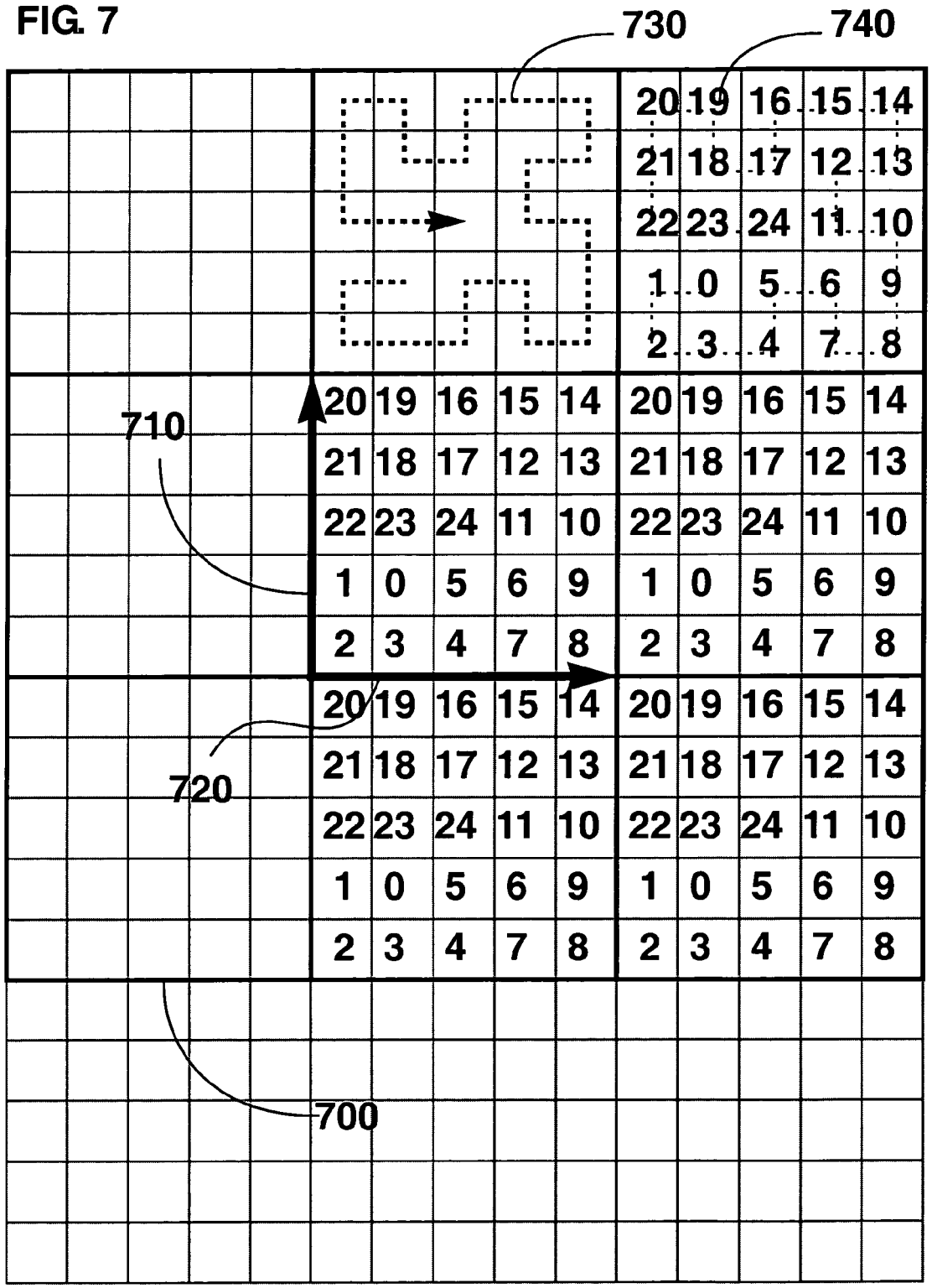
Figure 8:
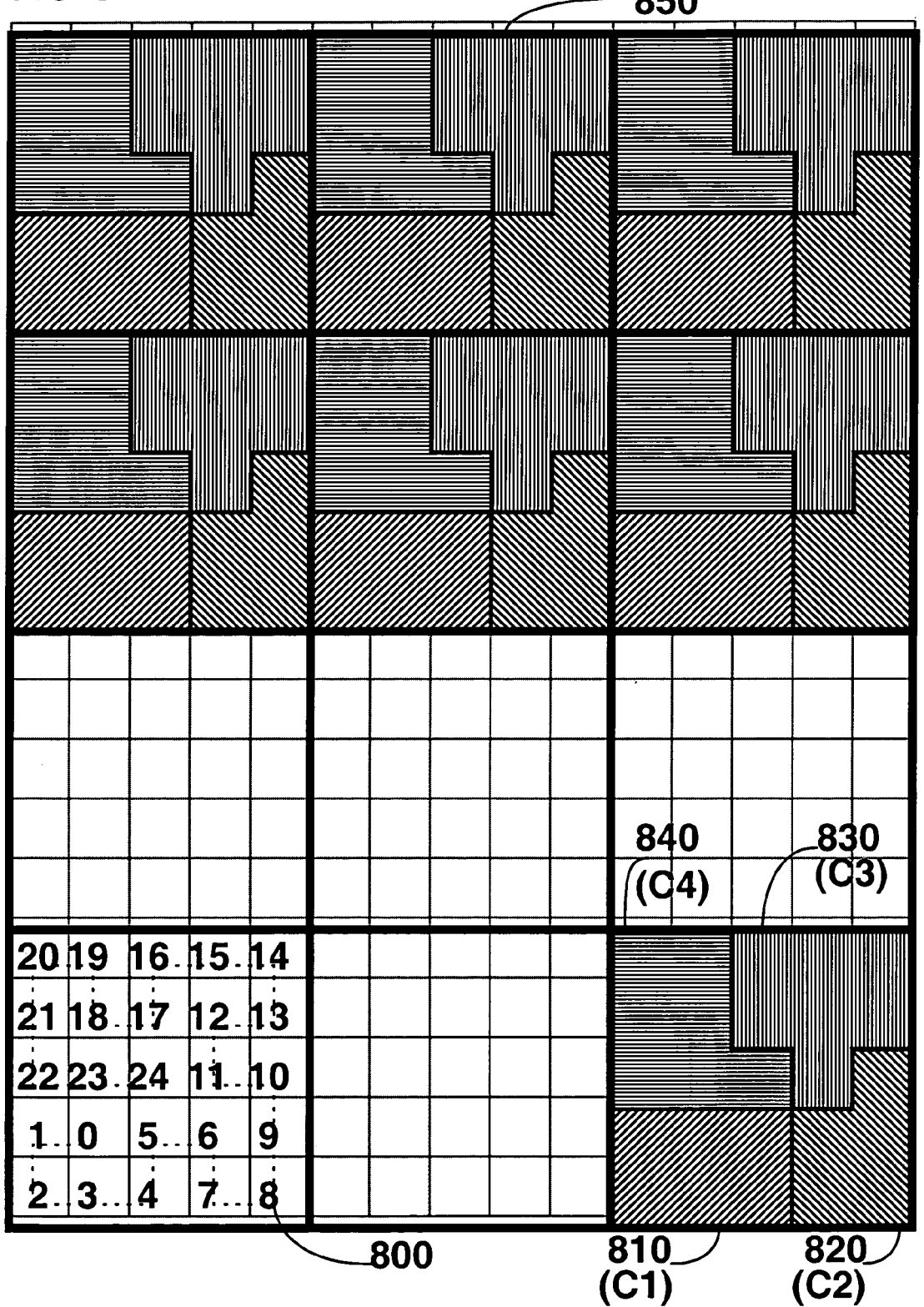
FIG. 8 illustrates the invented multi-color dithering halftoning method in the case of four primary colors by giving an example of a multicolor dithered image of a uniform color.

Referring to FIGS. 6–8, one-dimensional multi-color dithering can be extended to two-dimensional multi-color dithering, which is of practical interest because printing on a two-dimensional support (paper, films etc.) is the main purpose of color halftoning.

Like in prior art bi-level dithering, the continuous one-dimensional dither function G(x) may be replaced as shown in FIGS. 6–8 by a discrete two-dimensional dither function G(x,y). The dither function G(x,y) shown as example in FIG. 6 forms a repetitive tile 600 which paves the plane. Tile cells incorporate the discrete values G(x,y). This tile is characterized by two basic translation vectors 610 and 620. A set of discrete values of the dither function G(x,y) can be obtained by incrementing ordinal numbers 640 in the range [0 . . . S−1], where S is the area of the basic tile 600 expressed as the number of elementary cells, along the space-filling curve 630 which fills the tile and by subsequent normalization with the normalization coefficient 1/S.

Another example of construction of the basic tile and of the discrete dither function G(x,y) is shown in FIG. 7. The dither function G(x,y) in FIG. 7 forms a square tile 700, characterized by two basic translation vectors 710 and 720. A set of discrete values of the dither function G(x,y) can be obtained by incrementing ordinal numbers 740 along the space-filling curve 730 and by subsequent normalization with normalization coefficient 1/S.

FIG. 8 illustrates the mechanism of the invented halftoning method, in the example of four primary colors C1, C2, C3 and C4, and the two-dimensional discrete dither function G(x,y) shown in FIG. 7. Let us imagine an input color image C having a uniform color, which is reproduced by the weighted sum of the primary colors C1, C2, C3 and C4:

| $C = S_1(x,y)*C1 + S_2(x,y)*C2 + S_3(x,y)*C3 + S_4(x,y)*C4$ where | |
|---|---|
| $S_1(x, y) = 0.24$ | $S_2(x, y) = 0.20$ |
| $S_3(x, y) = 0.28$ | $S_4(x, y) = 0.28$ |

Applying the multi-color dithering mechanism described above to the color distribution map derived from the values of input signals $S_1(x,y)$, $S_2(x,y)$, $S_3(x,y)$ and $S_4(x,y)$ leads to the color dithered image shown in the area representing the top half (850) of FIG. 8. Each tile incorporates an area 810 filled with the primary color C1; an area 820 filled with the primary color C2; an area 830 filled with the primary color C3, and an area 840 filled with the primary color C4.

The clustered behavior of separate color areas is insured by the nature of the space-filling curve (FIG. 7, 730) which provides the successive cell numbers 800 of the dither function G(x,y). Various well-known space-filling curves like Hilbert's or Peano's space-filling curves, arranged to fill a tile, can meet the requirement of clustered behavior.

By choosing an appropriate space-filling curve which governs the process of generation of the dither function G(x,y), one can enhance a particular behavior of the halftoning process.

A further method of generating a discrete dither function consists in transforming a bi-level shape design into a grayscale intensity image by using a commercial image processing software package (Adobe PhotoShop, for example) and by applying histogram equalization to obtain the values of the discrete dither function.

Techniques known in the art for the creation of dither threshold functions, respectively dither arrays can be applied to create the dither functions used in multi-color dithering (see H. R. Kang, Digital Color Halftoning, SPIE Press/IEEE Press, 1999).

Color Separation for Non-Standard Inks (Primary Colors)

There are many reasons for printing with non-standard inks. One may want to enlarge the gamut of the printed image by printing for example with red, green and blue inks in addition to process colors cyan, magenta and yellow. One may also want to print with non-standard colors, in order to prevent counterfeiting documents with standard color copiers and printers printing only with cyan, magenta, yellow and black inks. For example, commercial goods packages, checks, identity cards and valuable documents need to be appropriately protected. Further protection may be given by printing with special inks, for example variable color inks, metallic inks or fluorescent inks (see Rudolf L. VanRenesse, Optical Document Security, Artech House 1998, chapters 7 and 9).

Let us assume that we have a set of primary colors, made of a freely chosen combination of standard (i.e. process color inks) and non-standard inks. Non-standard inks may comprise transparent non process color inks, opaque inks, metallic inks, variable color inks and fluorescent inks. An input color image is to be reproduced with the selected set of primary colors. One triplet of values $C_j$ given in the three-dimensional space ABC is associated to each of the primary colors j.

Figure 9B:
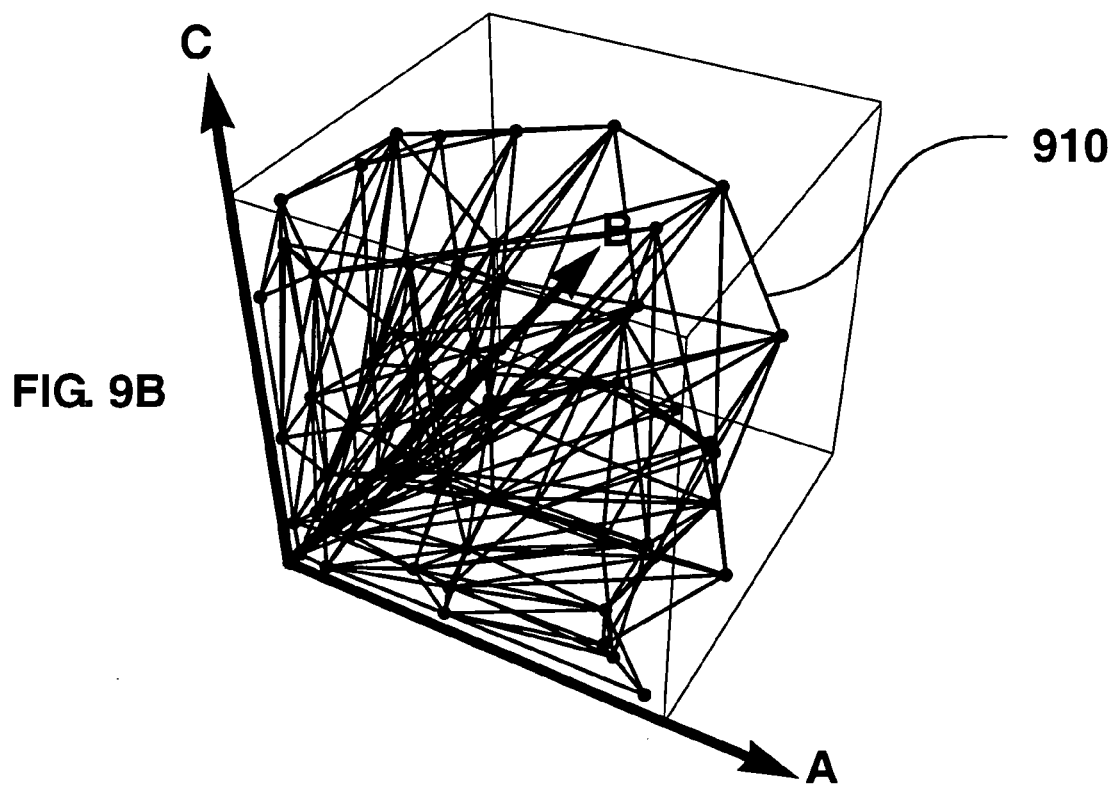
FIG. 9B shows a tetrahedral subdivision of the color subspace defined by the primary colors shown in FIG. 9A.

Let us now explain how relative normalized amounts of primary colors, i.e. how input signals $S_1(x,y)$, $S_2(x,y)$, $S_3(x,y)$ and $S_4(x,y)$ can be generated with respect to a given set of primary colors 900 in the three-dimensional working space ABC. According to a prior art method from the field of computational geometry (see for example J. D Boissonat, M. Teillaud, "A Hierarchical Representation of Objects: The Delaunay tree" Proceedings of the 2nd annual ACM Symposium on Computational Geometry, Yorktown Heights, N.Y., Jun. 2–4, 1986, pp. 260–268), a non-ambiguous process of subdivision of the space ABC into a set of tetrahedra having as vertices the primary colors 900 can be provided. FIG. 9B shows an example of such a subdivision into a set 910 of tetrahedra having as vertices the primary colors 900. The external boundary of the set 910 of all available tetrahedra whose vertices are the set 900 of available primary colors is often called the printable color gamut.

For an arbitrary input color C there are two possibilities: if it is located inside the set 910 given by the set of available primaries 900, color C is said to be "in gamut", or if it is located outside the set 910 given by the set of available primaries 900, color C is said to be "out of gamut". Without loss of generality, let us consider only the case of "in gamut" input colors: otherwise, a specific gamut-mapping method, which projects the colors from outside the color gamut back into the color gamut, should be provided (see E. J. Stollnitz, V Ostromoukhov, D. H. Salesin, Reproducing Color Images Using Custom Inks, Proceedings of SIGGRAPH 98, Annual Conference Series, 1998, pages 267–274).

For any input color C inside the gamut, a tetrahedron can be found which contains the input color. FIG. 10 shows a tetrahedron 1060 of the set 910 which contains an input color C. We would like to represent the input color C as a barycentric combination of the primary colors V1, V2, V3 and V4, vertices of the tetrahedron enclosing input color C. With a symbolic mathematical software package, for example Mathematica (http:www.wolfram.com) it is easy to show that the relative amounts of primary colors $S_1(x,y)$, $S_2(x,y)$, $S_3(x,y)$, $S_4(x,y)$ can be computed as follows.

The amount of primary color $S_1(x,y)$ associated with the vertex V1 is computed as the ratio between the Euclidean distance 1010 from the input color C to the tetrahedron's face V2-V3-V4, opposite to the vertex V1, and the Euclidean distance from the vertex V1 to the tetrahedron's face V2-V3-V4.

Similarly, the amount of primary color $S_2(x,y)$ associated with the vertex V2 is defined as the ratio between the Euclidean distance 1020 from the input color C to the tetrahedron's face V1-V3-V4, opposite to the vertex V2, and the Euclidean distance from the vertex V2 to the tetrahedron's face V1-V3-V4.

Similarly, the amount of primary color $S_3(x,y)$ associated with the vertex V3 is defined as the ratio between the Euclidean distance 1030 from the input color C to the tetrahedron's face V1-V2-V4, opposite to the vertex V3, and the Euclidean distance from the vertex V3 to the tetrahedron's face V1-V2-V4.

Similarly, the amount of primary color $S_4(x,y)$ associated with the vertex V4 is defined as the ratio between the Euclidean distance 1040 from the input color C to the tetrahedron's face V1-V2-V3, opposite to the vertex V4, and the Euclidean distance from the vertex V4 to the tetrahedron's face V1-V2-V3.

Amounts of primary colors $S_j(x,y)$ are also referred to as input signals $S_j(x,y)$. These signals are input signals for the subsequent multi-color dithering step.

When using real inks for the primary colors, one can allow as primary colors the colors resulting from the combinations of two or more inks by defining explicitly for each allowed combination of inks an additional color $C_k$ which becomes part of the set of primary colors 900 (FIG. 9A).

Color Image Reproduction Steps

The reproduction of color images by the invented multi-color dithering method comprises the following steps:

Step G1:

Define a two-dimensional dither function G(x,y). It may either be large and cover the full output image space or be a repetitive tile which paves the plane. A repetitive tile is characterized by two basic translation vectors and by a set of discrete values, one for every elementary cell of the tile. One possible way of building the discrete values consists in incrementing ordinal numbers along a space-filling curve which walks through the elementary cells of a tile. A two-dimensional dither function G(x,y) can be stored in a dither function storage unit.

Step G2:

Choose a set of primary colors $\{C_i\}$ located within a three-dimensional color working space ABC, where ABC stands for any convenient representation of a three-dimensional color space, such as RGB, CIE-XYZ, CIE-LAB, or any other color space representation used in the art. Usually the set of primary colors $\{C_i\}$ represents the set of available basic colors used for reproduction, such as, for example, a set of Pantone inks. The set of primary colors contains also the permitted superpositions of pure inks. It can also represent the set of available basic colors used to represent an image (for example, many TIFF color images are represented by a set of 256 basic colors). A primary color may also be the color associated with a metallic ink, with a variable color ink seen from a certain angle, or with a fluorescent ink seen with normal light.

Step G3:

Initialize a procedure defining a neighborhood in three-dimensional color space, for example a procedure which renders neighbor primary colors $\{C_j\}$ of a given input color C expressed in the three-dimensional color working space ABC, where j is an integer number in the range [0 . . . $N_{neighbors}$-1] and where $N_{neighbors}$ expresses the number of considered neighbors.

Step G4:

For every individual pixel (x,y) of the output image (resulting dithered image), apply steps G4.1 to G4.4. The coordinates (x,y) of each pixel of the output image define the corresponding value of the two-dimensional dither function G(x,y).

Step G4.1: Find the corresponding location (x',y') in the input color image in the same way as in prior art bi-level dithering and determine color C(x',y') at that location. Usually, a linear interpolation technique is used to derive color C from the colors of neighboring input image pixels, i.e. pixels located in the neighborhood of loation (x',y'). Nevertheless, other interpolation techniques known in the art can be equally applied. The input color C(x',y') in general does not belong to the set of primary colors $\{C_i\}$.

Step G4.2: Find the neighbor colors $\{C_j\}$ among the primary colors $\{C_i\}$, using the procedure rendering the neighbors of a given input colour in the ABC color working space.

Step G4.3: In order to reproduce input color C(x',y'), compute for neighbor colors $\{C_j\}$ their relative normalized amounts, i.e. their corresponding signals $\{S_j(x,y)\}$.

Step G4.4: At the current (x,y) pixel, determine the partition within which the two-dimensional dither function G(x,y) is situated and accordingly, put the corresponding output primary color O(x,y) at pixel (x,y) of the output image. Proceed according to the following detailed rules:

if dither function G(x,y) is situated within partition P1, i.e. $0 < G(x,y) <= S_1(x,y)$, O(x,y) is assigned the neighbor color $C_1$;

if dither function G(x,y) is situated within partition P2, i.e. $S_1(x,y) < G(x,y) <= S_1(x,y) + S_2(x,y)$, O(x,y) is assigned the neighbor color $C_2$;

. . .

if dither function G(x,y) is situated within partition PN, i.e. $S_1(x,y) + \ldots + S_{j-1}(x,y) < G(x,y) <= S_1(x,y) + \ldots + S_N(x,y)$, O(x,y) is assigned the neighbor color $C_N$, where N is the number of neighbor colors in set $\{C_j\}$.

In a preferred embodiment, steps G3–G4 and substeps G4.1 to G4.4 can be implemented as steps P3–P4 and substeps P4.1 to P4.4 as described below.

Step P3 (Preferred Embodiment of Step G3):

In order to define a neighborhood in 3D color space, subdivide the color working space ABC into a set of tetrahedra $\{T_k\}$, which do not intersect each other and whose vertices are the set of primary colors. According to known results in computational geometry, such a subdivision is always possible, for any set $\{C_j\}$ of primary colors. A subdivision according to Delauney has been extensively studied (see for example J. D Boissonat, M. Teillaud, "A Hierarchical Representation of Objects: The Delaunay tree", Proceedings of the 2nd annual ACM Symposium on Computational Geometry, Yorktown Heights, N.Y., Jun. 2–4, 1986, pp. 260–268). We consider only non-degenerate tetrahedra, i.e. tetrahedra which have a non-zero volume.

Step P4 (Preferred Embodiment of Step G4):

For every individual pixel (x,y) of the output image, apply the steps P4.1–P4.4:

Step P4.1: Find the corresponding location (x',y') in the input color image and determine color C(x',y') at that location as explained in step G4.1.

Step P4.2: Find the tetrahedron T in the tetrahedral subdivision $\{T_k\}$ which contains color C(x',y'). The simplest method of finding the tetrahedron T consists in applying to candidate tetrahedra $T_i$ of the set $\{T_k\}$ an "interior membership test" to verify if color C(x',y') is inside tetrahedron $T_i$ (see section "Interior Membership Test" below). The tetrahedron of the set $\{T_k\}$ which contains the color C(x',y') is designated as T. The 4 vertices of T are the neighbors of color C and designated as primary colors $C_1$, $C_2$,$C_3$,$C_4$. Techniques speeding up the search of tetrahedron T containing color C can be applied (see for example P. C. Hung, Colorimetric calibration in electronic imaging devices using a look-up-table model and interpolations, Journal of Electronic Imaging Vol. 2, No. 1, pp. 53–61, January 1993, section 3.1, page 56).

Step P4.3: Find the four ratios between the Euclidian distances from the input color C(x',y') to every of the four faces of the tetrahedron T found in step P4.2, and the Euclidean distances from the same tetrahedron's faces to their opposite vertices, according to the technique described in section "Color separation for non-standard inks". These four ratios define the values of input signals $S_1(x,y)$, $S_2(x,y)$, $S_3(x,y)$ and $S_4(x,y)$, associated to the current output image pixel (x,y).

Step P4.4: At the current (x,y) pixel, determine the partition within which the two-dimensional dither function G(x,y) is situated and accordingly, put the corresponding output primary color O(x,y) at pixel (x,y) of the output image. Proceed according to the following detailed rules:

if dither function G(x,y) is situated within partition P1, i.e. $0<G(x,y)<=S_1(x,y)$, O(x,y) is assigned color C1 associated with the vertex of tetrahedron T used in step P4.3 to define the signal $S_1(x,y)$;

if dither function G(x,y) is situated within partition P2, i.e. $S_1(x,y)<G(x,y)<=S_1(x,y)+S_2(x,y)$, O(x,y) is assigned color C2 associated with the vertex of the tetrahedron T used in the step P4.3 to define the signal $S_2(x,y)$;

if dither function G(x,y) is situated within partition P3, i.e. $S_1(x,y)+S_2(x,y)<G(x,y)<=S_1(x,y)+S_2(x,y)+S_3(x,y)$, O(x,y) is assigned color C3 associated with the vertex of the tetrahedron T used in the step P4.3 to define the signal $S_3(x,y)$;

if dither function G(x,y) is situated within partition P4, i.e. $S_1(x,y)+S_2(x,y)+S_3(x,y)<G(x,y)<=S_1(x,y)+S_2(x,y)+S_3(x,y)+S_4(x,y)$, O(x,y) is assigned color C4 associated with the vertex of the tetrahedron T used in step P4.3 to define the signal $S_4(x,y)$.

Interior Membership Test

The procedure described in Step P4.2 applies the so-called "interior membership test" in order to check if an input color C(x',y') in three-dimensional color space ABC is inside a tetrahedron T defined by its four vertices. Referring to FIG. 10, the input color C is defined as the triplet (x,y,z) in the three-dimensional space ABC 1050. Within the present section, we assume that the 3 axes defining the three-dimensional space ABC are the x, y and z axes. An arbitrary tetrahedron T is defined by its four vertices V1=(x1,y1,z1), V2=(x2,y2,z2), V3=(x3,y3,z3) and V4=(x4,y4,z4). Every set of three vertices of the tetrahedron T forms a triange, i.e. a tetrahedron's face lying within a single plane:

vertices V1=(x1,y1,z1), V2=(x2,y2,z2) and V3=(x3,y3,z3) define the tetrahedron's face V1-V3-V2 and the corresponding plane_V1V3V2;

vertices V1=(x1,y1,z1), V2=(x2,y2,z2) and V4=(x4,y4,z4) define the tetrahedron's face V1-V2-V4 and the corresponding plane_V1V2V4;

vertices V1=(x1,y1,z1), V3=(x3,y3,z3) and V4=(x4,y4,z4) define the tetrahedron's face V1-V3-V4 and the corresponding plane_V3V1V4;

vertices V2=(x2,y2,z2), V3=(x3,y3,z3) and V4=(x4,y4,z4) define the tetrahedron's face V2-V3-V4 and the corresponding plane_V2V3V4.

It should be noted that the normals to the so-defined planes plane_V1V3V2, plane_V1V2V4, plane_V3V1V4, and plane_V2V3V4 are always directed to the inside of the considered tetrahedron T.

The "interior membership test" can be formulated as follows:

```
dist (pt_xyz, plane_V2V3V4) > 0 &&
dist (pt_xyz, plane_V3V1V4) > 0 &&
dist (pt_xyz, plane_V1V2V4) > 0 &&
dist (pt_xyz, plane_V1V3V2) > 0
``` where && stands for the AND logical operator and where the Euclidean distance from the point pt_xyz given by its coordinates (x,y,z) to a plane defined by the tetrahedron's vertices $\{V_j\}$ can be calculated as follows (standard three-dimensional distance computation procedure, based on the Hessian normal form, see Bronstein, Semendyayev, Handbook of Mathematics, Springer, 3rd revised edition, 1997, section 2.6.6.2, p 208):

$$\mathrm{dist}(pt\_xyz, \mathrm{plane}\_W1W2W3) = (a^*x + b^*y + c^*z + d) / \mathrm{Sqrt}[(a^*a + b^*b + c^*c)]$$

where a, b, c and d are expressed by the coordinates of the vertices W1=(x1,y1,z1), W2=(x2,y2,z2) and W3=(x3,y3,z3):

```
a = -(y2*z1) + y3*z1 + y1*z2 - y3*z2 - y1*z3 + y2*z3;
b = x2*z1 - x3*z1 - x1*z2 + x3*z2 + x1*z3 - x2*z3;
c = -(x2*y1) + x3*y1 + x1*y2 - x3*y2 - x1*y3 + x2*y3;
d = x3*y2*z1 - x2*y3*z1 - x3*y1*z2 + x1*y3*z2 + x2*y1*z3 - x1*y2*z3;
```

Note that the formal parameter plane_W1W2W3 in the procedure dist (pt_xyz,plane_W1W2W3) stands for the real coordinate sets plane_V2V3V4, plane_V3V1V4, plane_V1V2V4 and plane_V1V3V2.

The same point to plane distance computation procedure as above can be used to compute the Euclidian distances in section "Color separation for non-standard inks".

An alternative "Interior Membership Test" is described in section 3.1, page 56 in P. C. Hung, "Colorimetric calibration in electronic imaging devices using a look-up-table model and interpolations", Journal of Electronic Imaging Vol. 2, No. 1, pp. 53–61, January 1993, section 3.1.

Artistic Multi-Color Dithered Images

Figure 11:
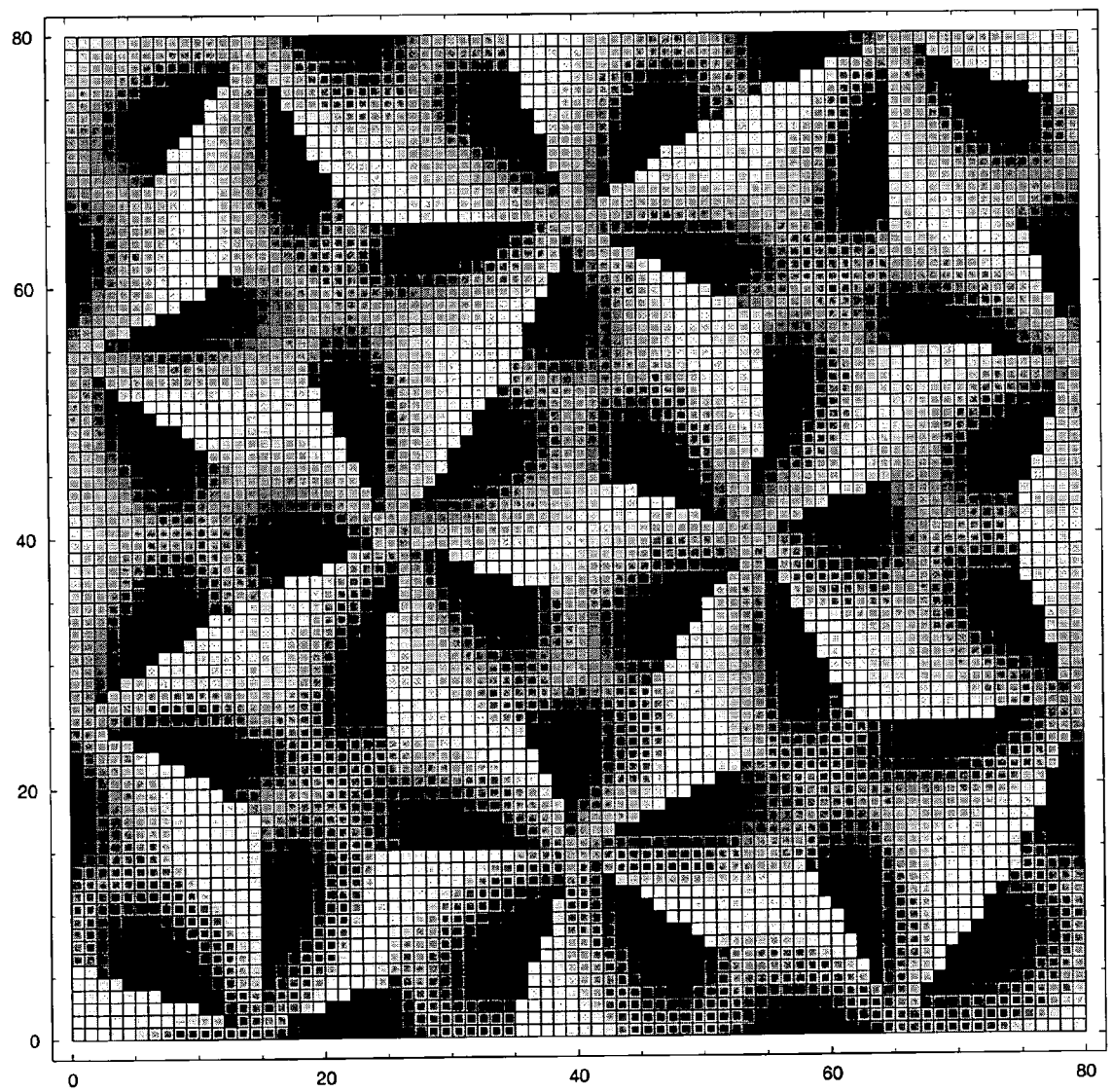
FIG. 11 shows an example of a large dither array incorporating artistic screen shapes.

In order to produce artistic multi-color dithered color images, i.e. color images whose screen elements are made of artistic color screen shapes (letters, symbols, ornaments) and to produce images whose high level of detail make counterfeiting very difficult (security documents such as banknotes, checks, identity cards, passports, etc.), one must generate very large discrete dither functions, also called dither arrays, incorporating artistic screen shapes. Techniques for generating high-quality large dither arrays are described in an article written by the inventors (see V. Ostromoukhov, R. D. Hersch, Multi-Color and Artistic Dithering, Proceedings Siggraph '99, ACM Computer Graphics Proceedings, Annual Conference Series, 1999, 425–432). An example of a large dither array incorporating artistic screen shapes generated according to these techniques is given in FIG. 11 (dither levels G(x,y) between 0 and 1 are represented by increasing intensities, from black to white). With this dither array, we can reproduce a color image with a given set of primary colours. In the present example, we consider as input color image a color wedge with the following colors at its wedge vertices (RGB values are given as a triplet of discrete values between 0 and 255):

lower-left: Purple (Pantone 2612 CVU, RGB={128, 64, 127}), upper left: unsaturated Green (close to Pantone 577 CVU, RGB={128, 191, 127}), upper right: Yellow-Orange (Pantone 129 CVU, RGB={255, 191, 32}), lower right: Warm Red (Pantone Warm Red CVU, RGB={255, 64, 32}).

Figure 12:
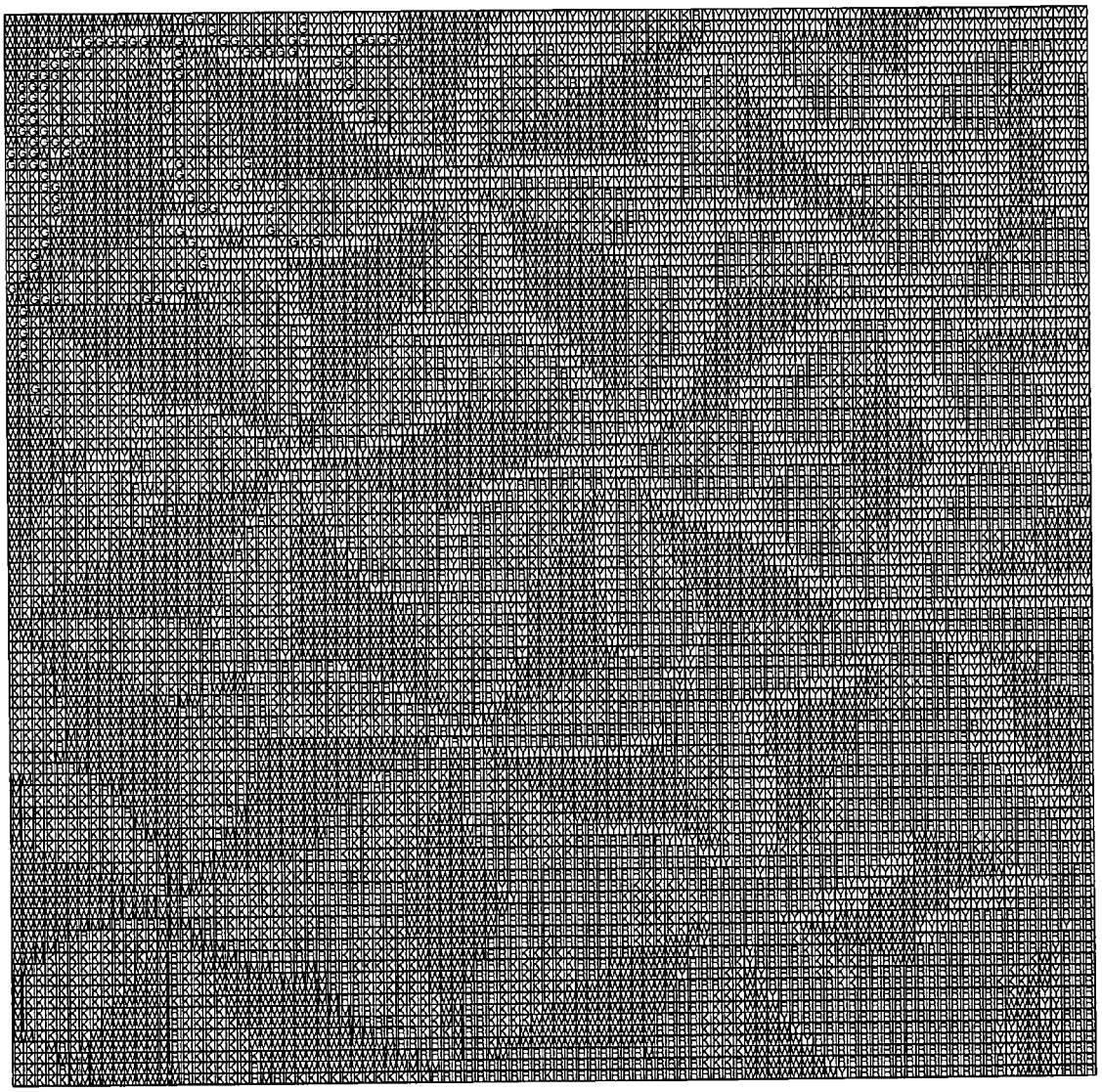
FIG. 12 shows the representation of a color wedge dithered with the dither array of FIG. 11, using cyan, magenta, yellow, red, green, blue, black and white primary colors.
Figure 13:
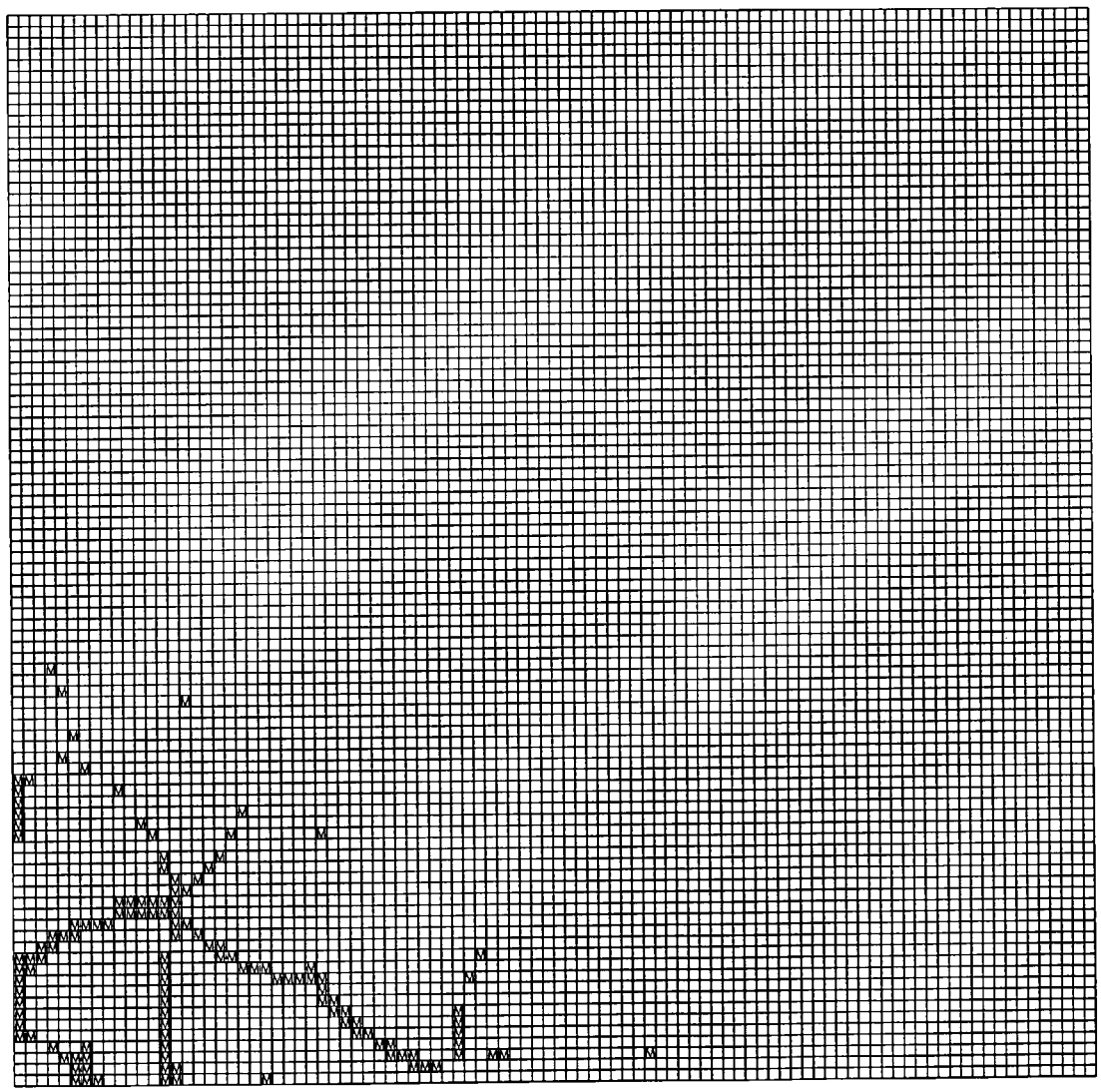
FIG. 13 shows the magenta layer of the dithered image of FIG. 12.
Figure 14:
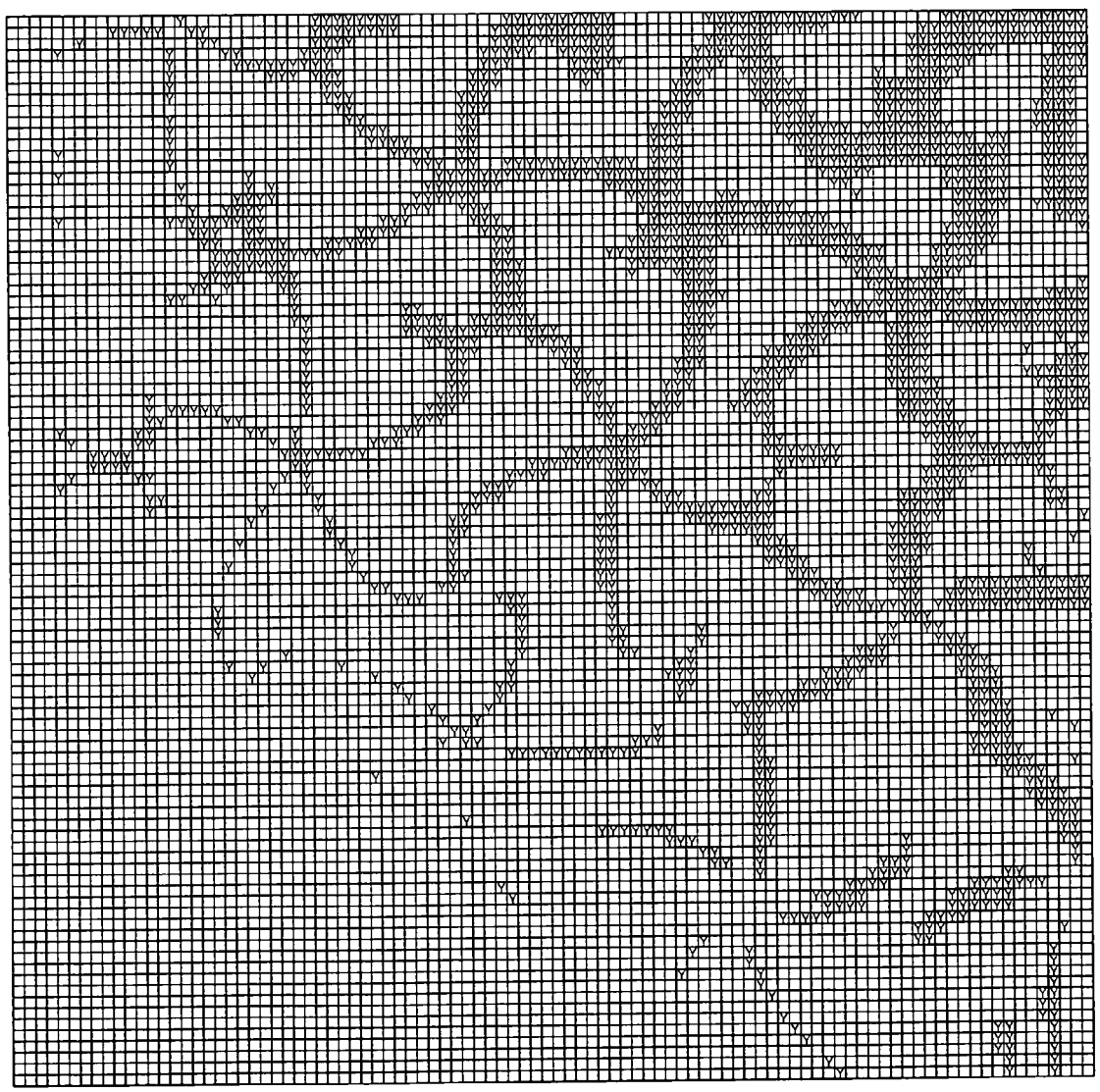
FIG. 14 shows the yellow layer of of the dithered image of FIG. 12.
Figure 15:
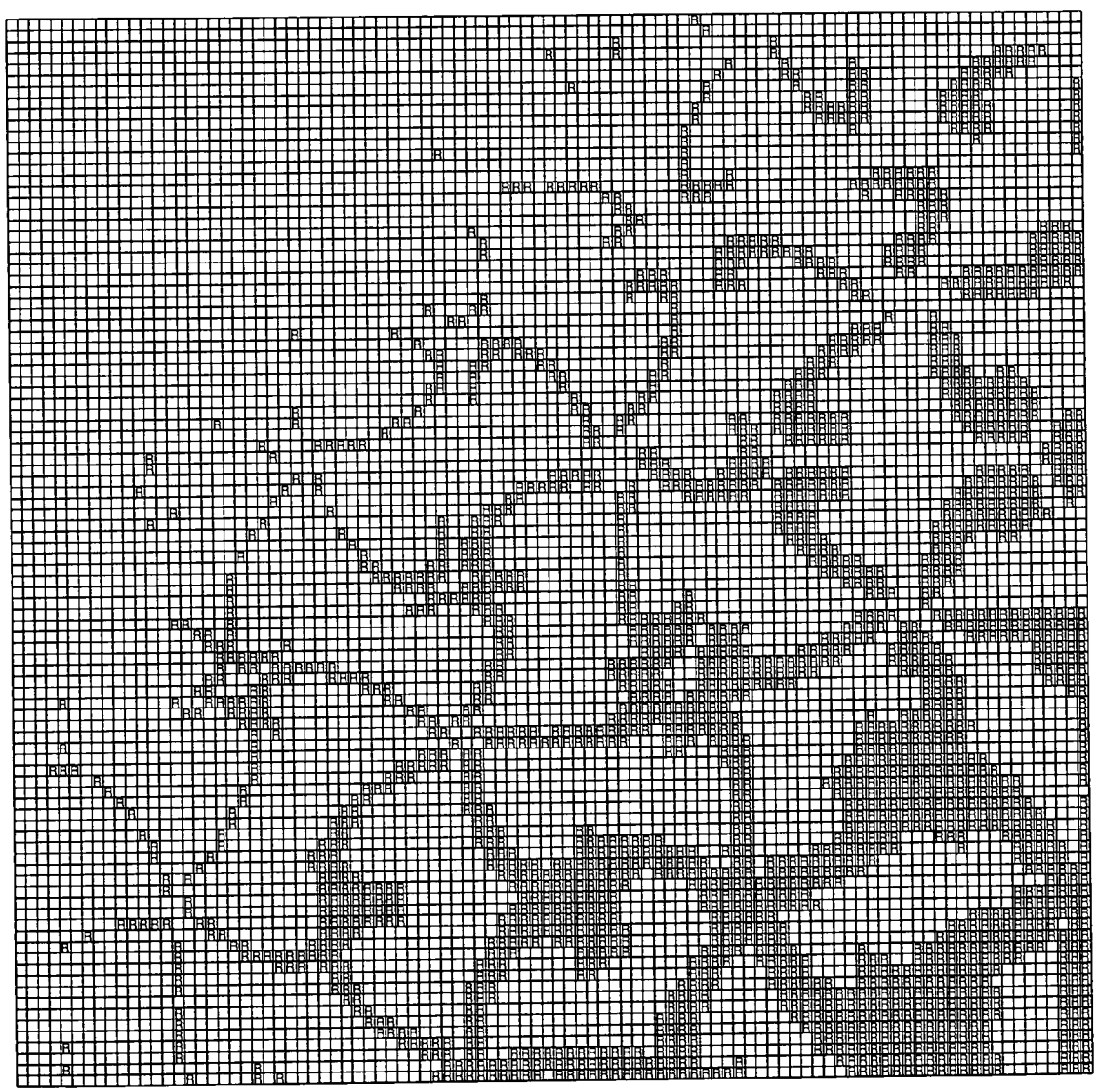
FIG. 15 shows the red layer of of the dithered image of FIG. 12.
Figure 16:
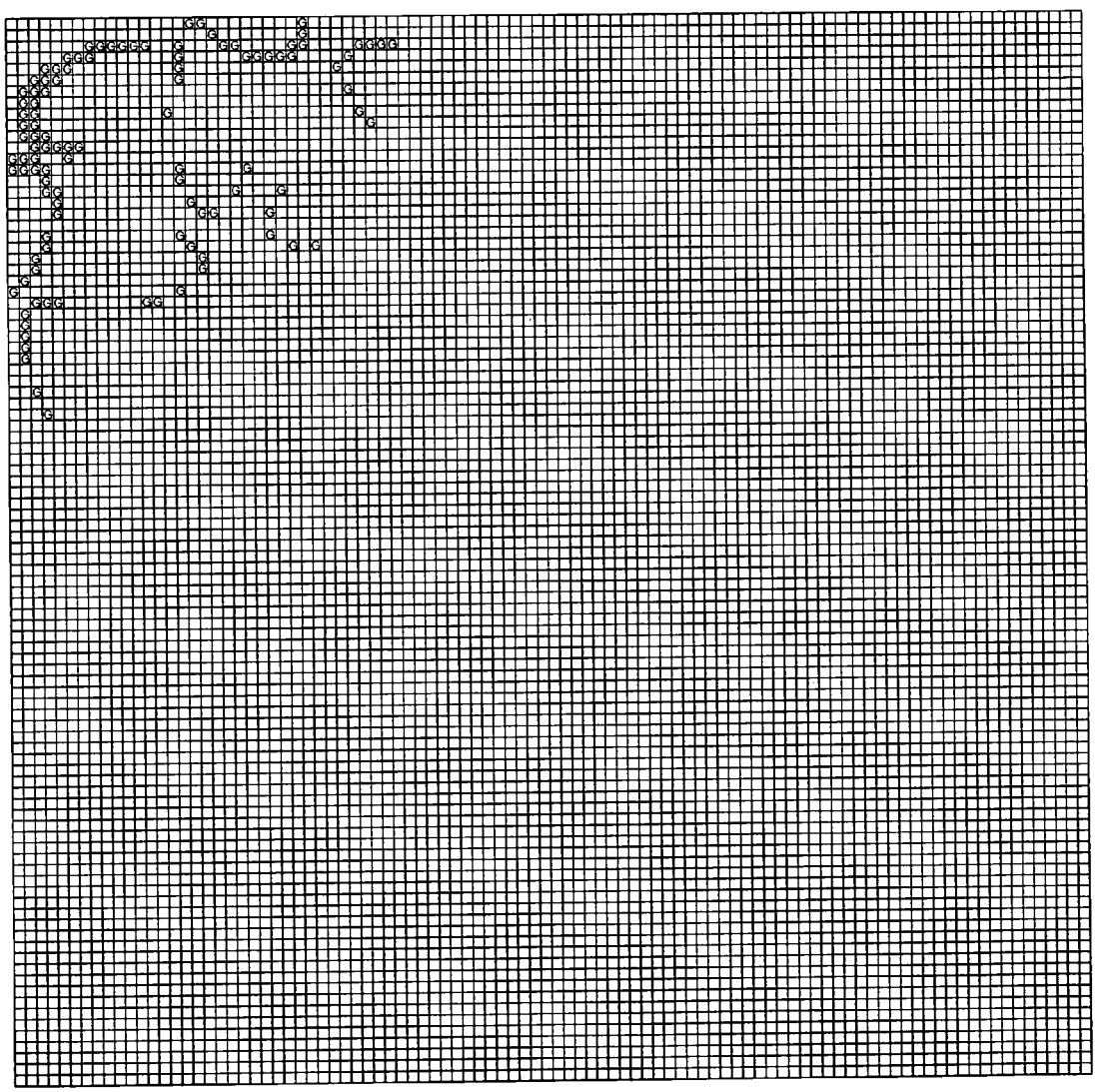
FIG. 16 shows the green layer of of the dithered image of FIG. 12.
Figure 17:
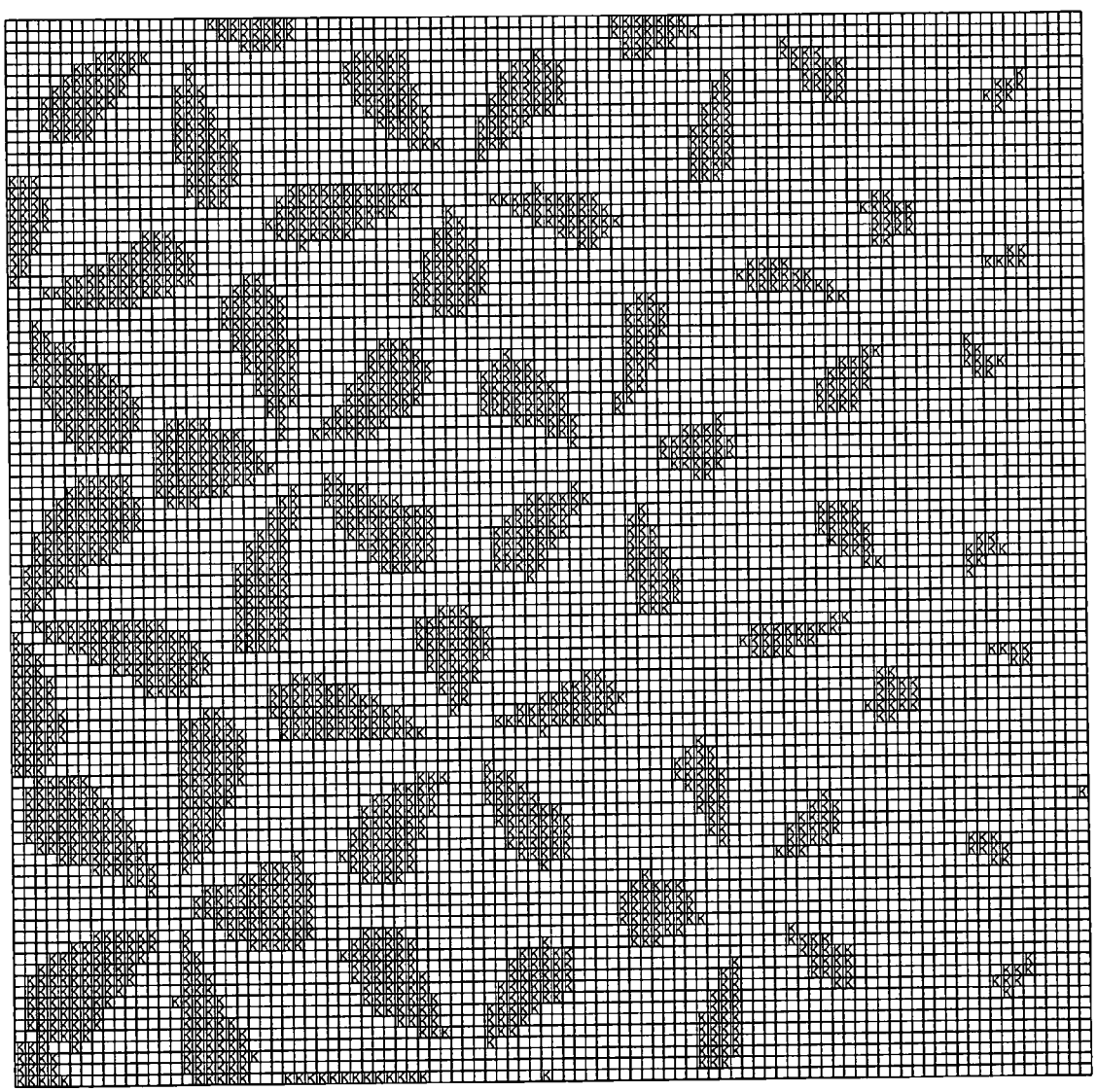
FIG. 17 shows the black layer of of the dithered image of FIG. 12.
Figure 18:
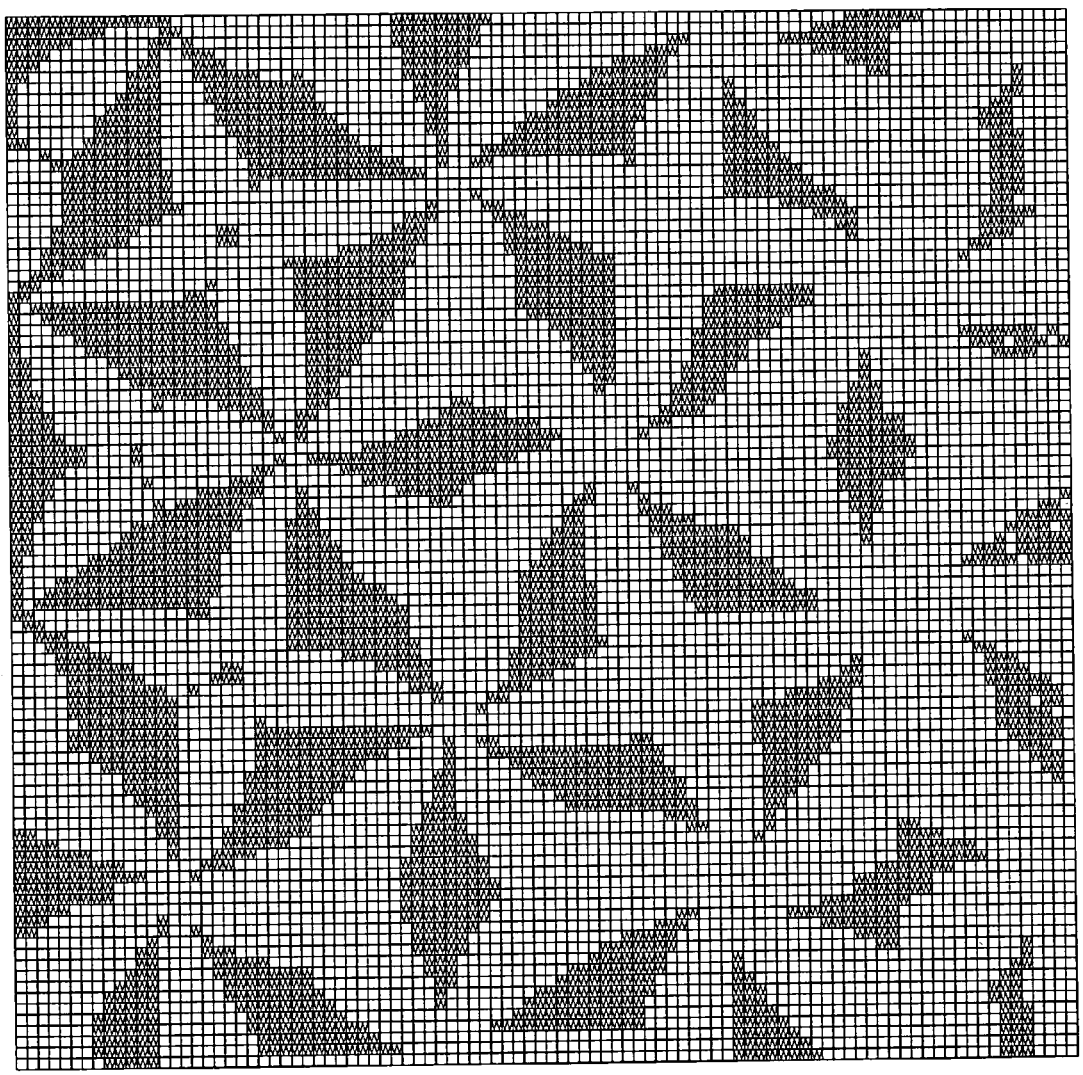
FIG. 18 shows the white layer of of the dithered image of FIG. 12.

The resulting multi-color dithered image using primary colors cyan (C), magenta (M), yellow (Y), red (R), green (G), blue (B), black (K) and white (W) is shown in FIG. 12. Only colors yellow (Y), magenta (M), red (R), green (G), black (K), and white (W) are needed to reproduce the color image wedge given above. The separations resulting from color separation and multi-color dithering are the magenta (M) layer (FIG. 13), the yellow (Y) layer (FIG. 14), the red (R) layer (FIG. 15), the green (G) layer (FIG. 16), the black (K) layer (FIG. 17) and the white (W) layer (FIG. 18).

Figure 19:
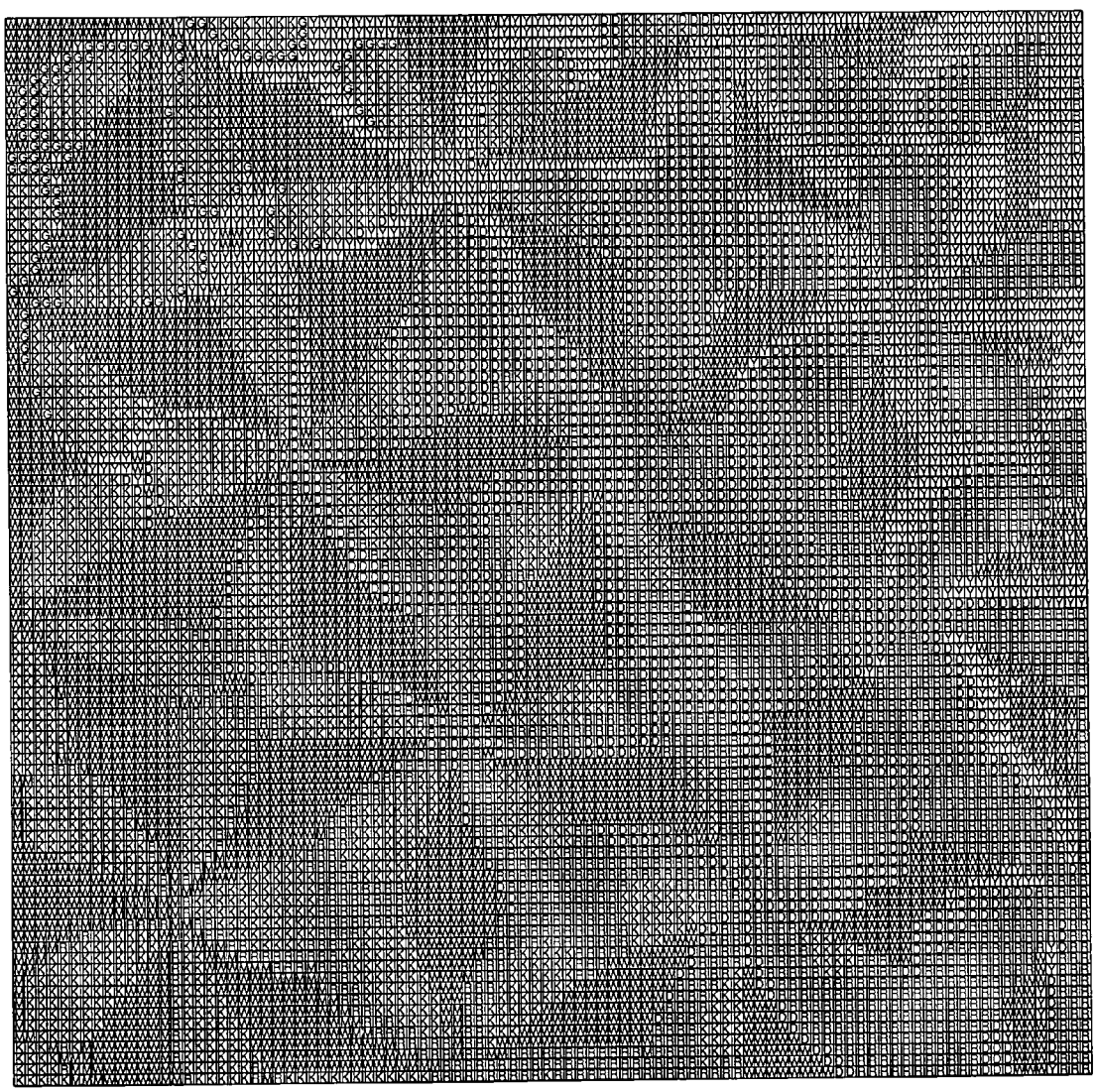
FIG. 19 shows the representation of the same color wedge dithered with the dither array of FIG. 11, using brown-gold, cyan, magenta, yellow, red, green, blue, black and white primary colors.
Figure 20:
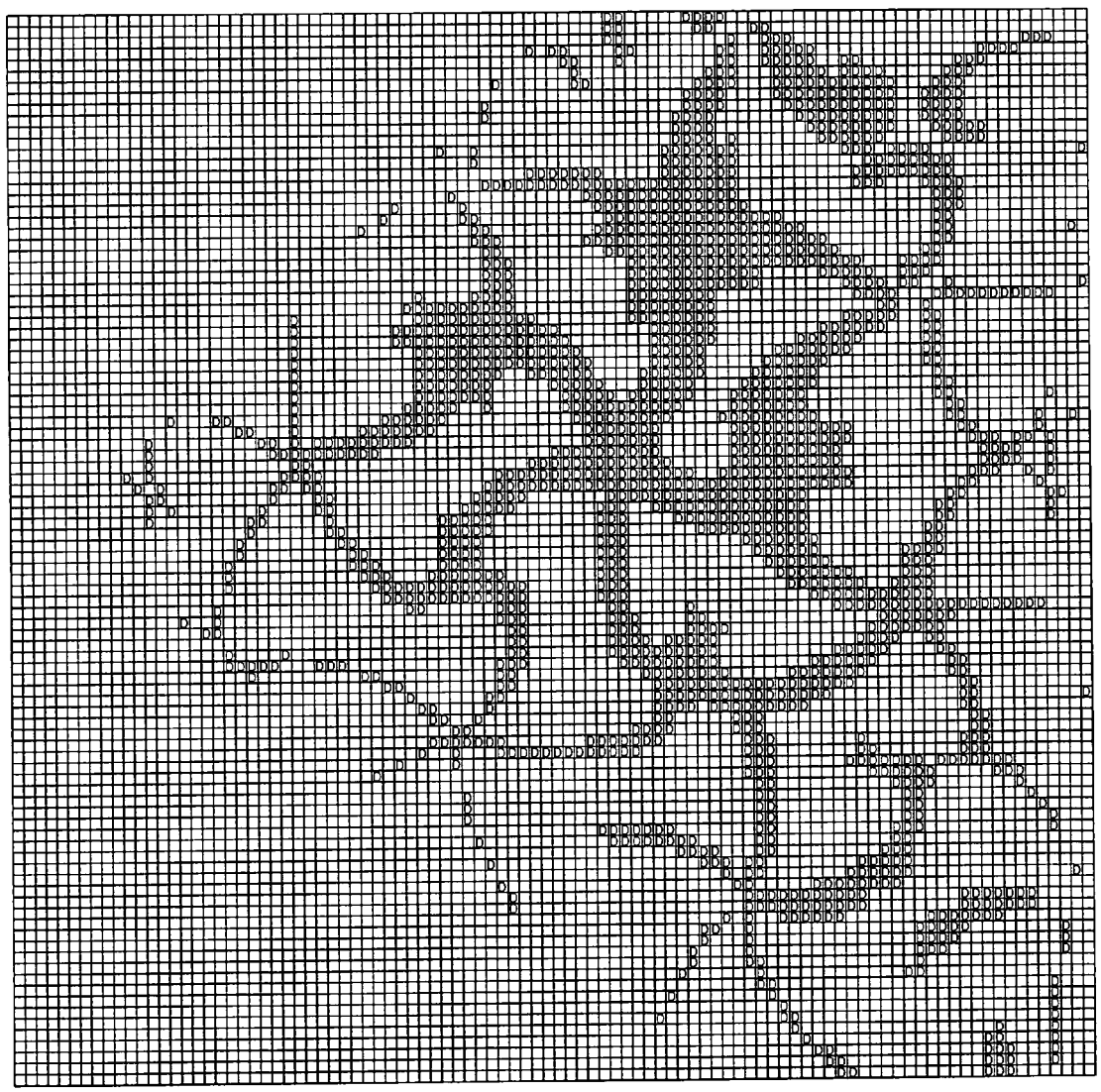
FIG. 20 shows the brown-gold layer of of the dithered image of FIG. 19.
Figure 21:
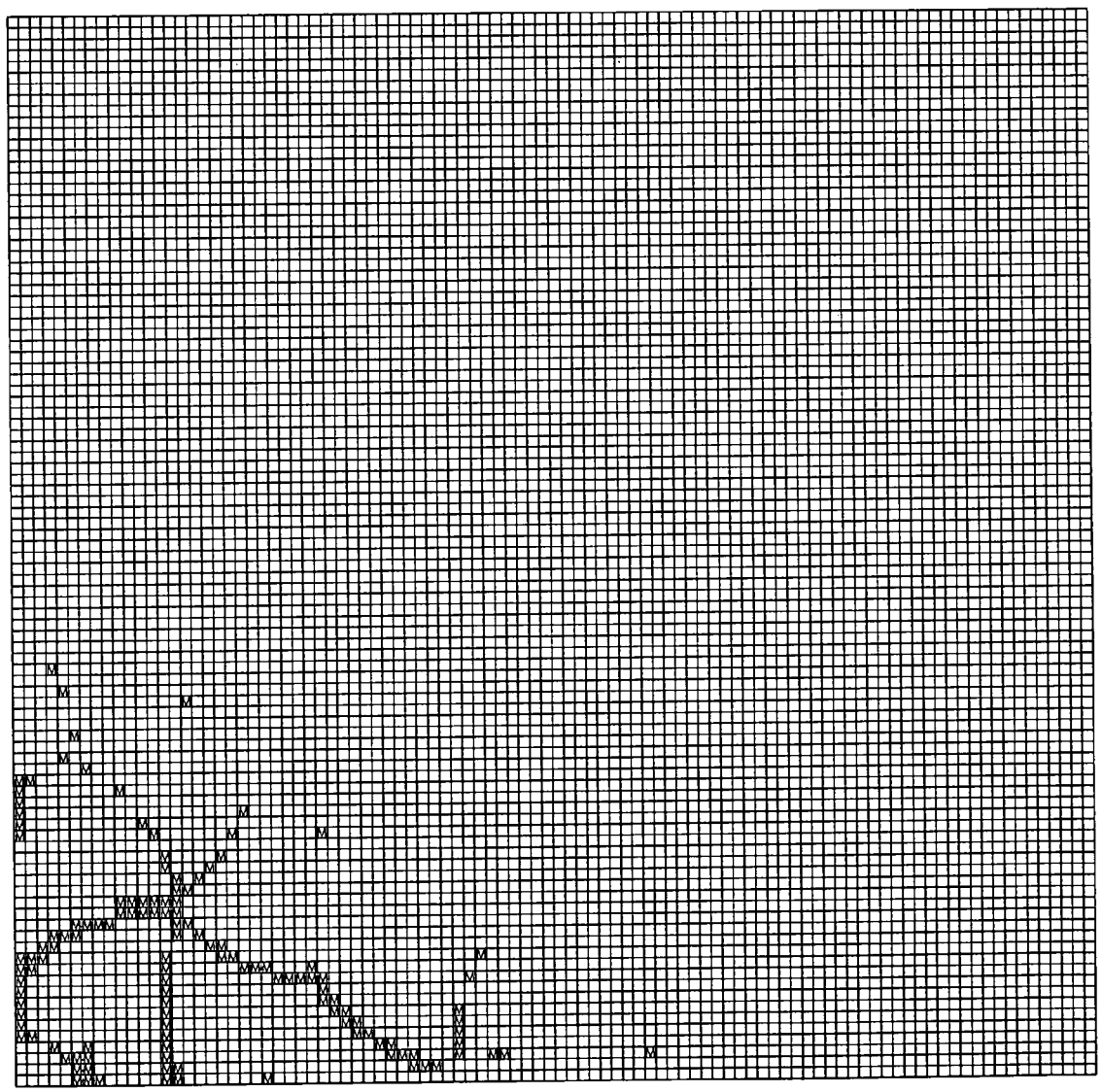
FIG. 21 shows the magenta layer of of the dithered image of FIG. 19.
Figure 22:
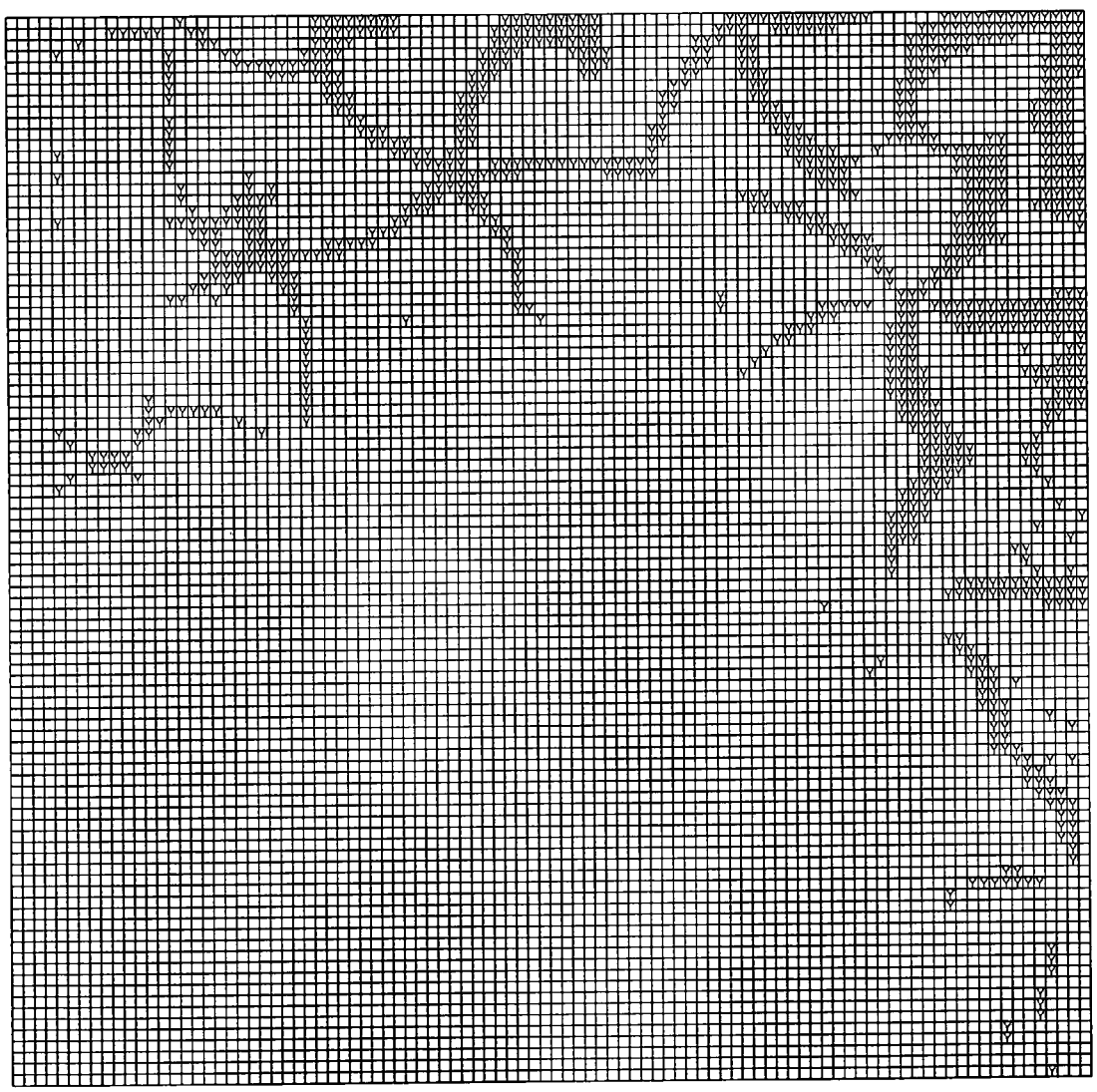
FIG. 22 shows the yellow layer of of the dithered image of FIG. 19.
Figure 23:
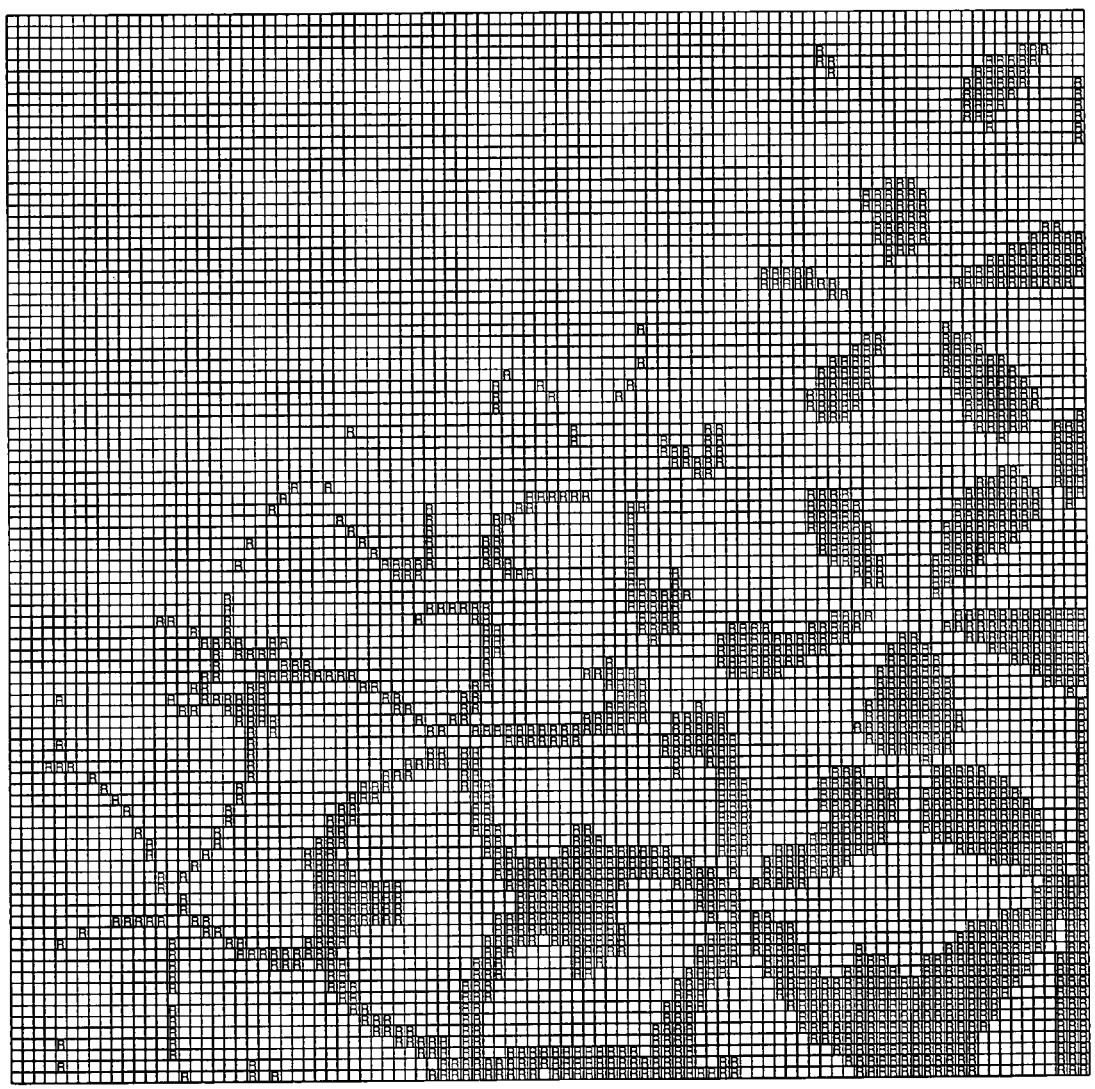
FIG. 23 shows the red layer of of the dithered image of FIG. 19.
Figure 24:
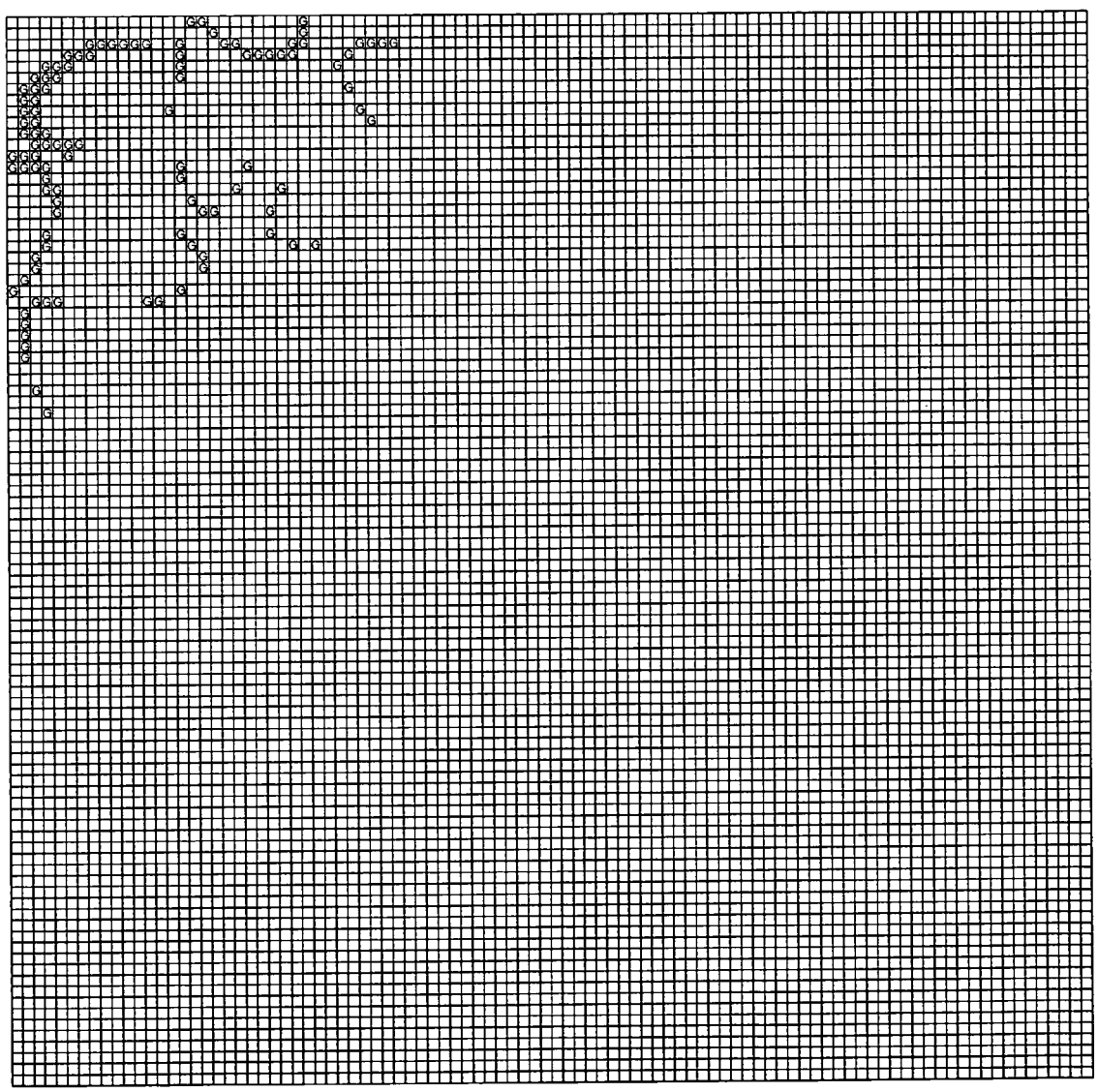
FIG. 24 shows the green layer of of the dithered image of FIG. 19.
Figure 25:
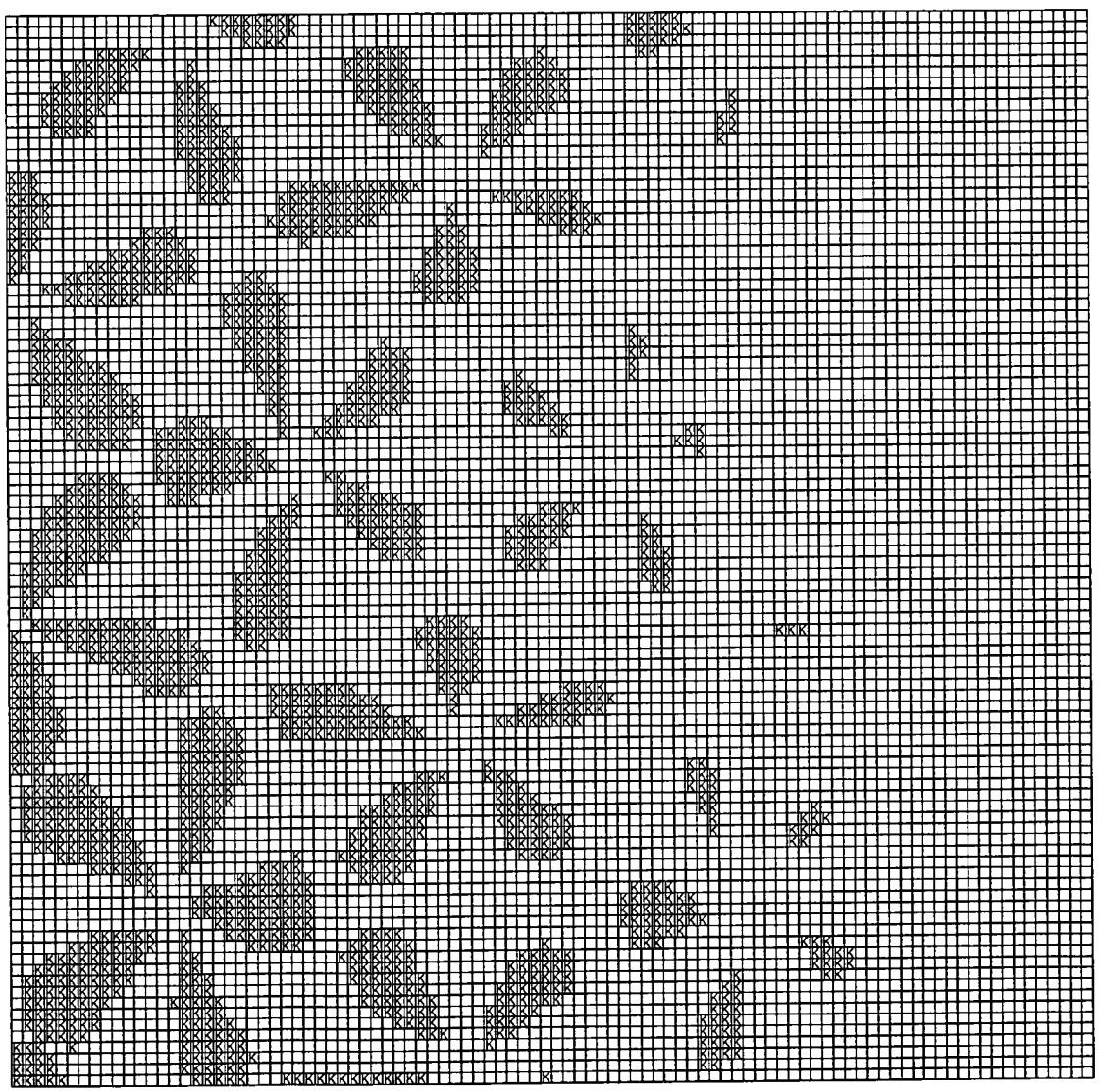
FIG. 25 shows the black layer of of the dithered image of FIG. 19.
Figure 26:
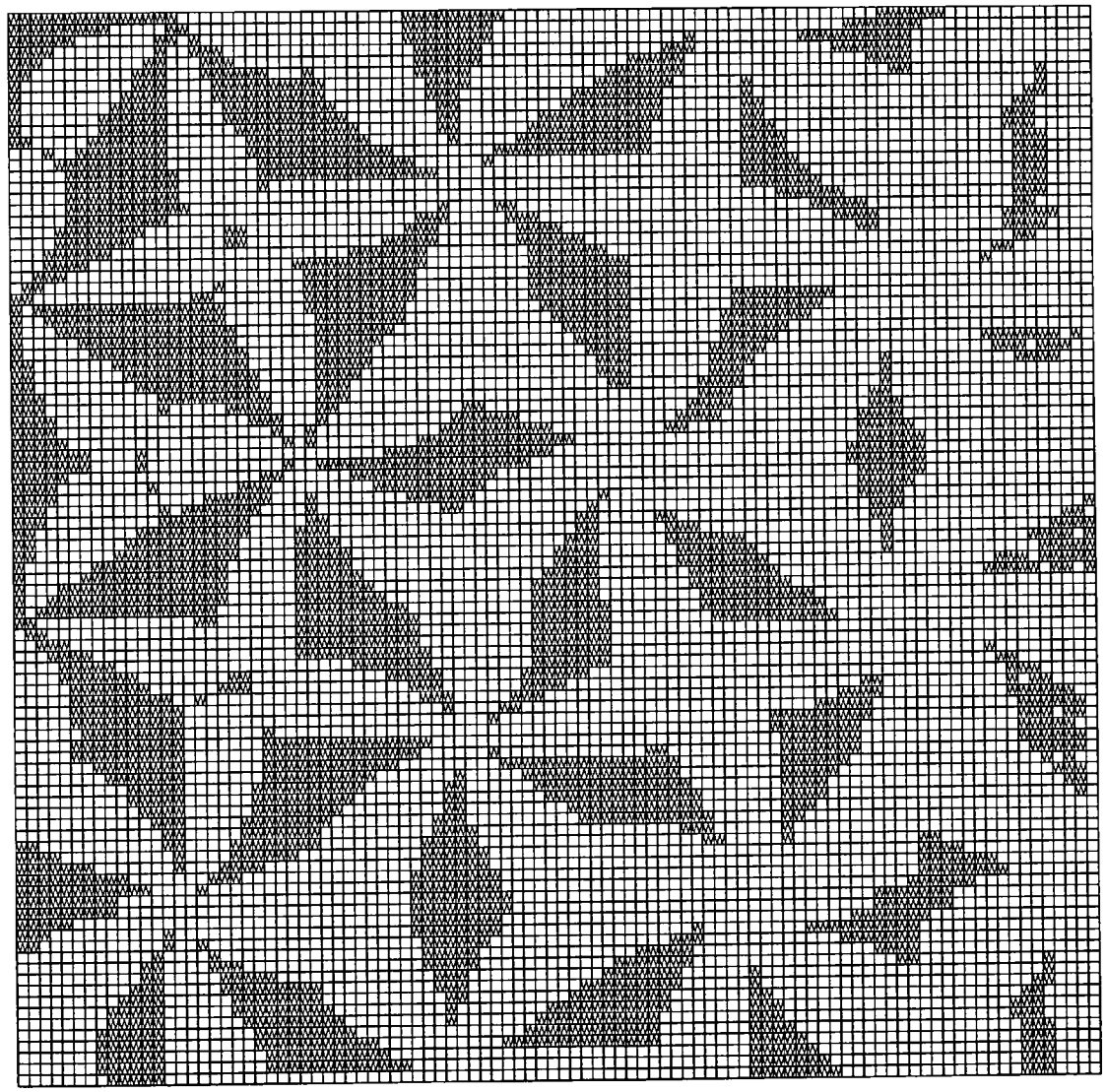
FIG. 26 shows the white layer of of the dithered image of FIG. 19.

Altenatively, one may use in addition to primary colors cyan (C), magenta (M), yellow (Y), red (R), green (G), blue (B), black (K) and white (W) an additional brown-gold (D) non-standard primary color close to Pantone 145 CVU (RGB=193, 130, 10). FIG. 19 shows the corresponding resulting multi-color dithered image. The separations comprise the brown-gold (D) non-standard color layer (FIG. 20), the magenta (M) layer (FIG. 21), the yellow (Y) layer (FIG. 22), the red layer (FIG. 23), the green (G) layer (FIG. 24) the black (K) layer (FIG. 25), and the white (W) layer (FIG. 26). Both examples show that each output pixel only belongs to one primary color layer and that primary colors are only printed side by side (no overlap of primary colors).

When prepared at a high resolution of R dots per inch (dpi), for example 1200, 2540 or 4000 dpi and printed at a resolution $R_p >= R$, these multi-color dithered images are extremely difficult to reproduce by potential counterfeiters. An attempt to photocopy such a multi-color dithered image with a photocopying device of resolution lower than R results in a heavy degradation or a loss of the artistic shape (micro-letters, symbols, ornaments) and in the loss of the original non-standard ink primary colors. Non-standard inks are primary colors selected specifically for preventing counterfeiting, i.e. colors which are significantly different from process colors cyan, magenta and yellow. They may be transparent or opaque. Non-standard inks comprise also metallic inks, variable color inks and fluorescent inks.

Printing a multi-color dithered image with non-standard opaque inks at a high registration accuracy, for example at a registration accuracy $u_a >= 1/(2R)$ inch, makes counterfeiting extremly difficult to achieve. This is due to the fact that printing at a registration accuracy $u_a < 1/R$ inch yields ink overlaps which induce strong color shifts.

Printing a multi-color dithered image with one or several non-standard fluorescent inks allows to reveal the artistic dot shape when the printed image is examined under UV light. The incorporation of one or several fluorescent inks into the multi-color dithered output image provides a good anti-counterfeiting protection, since it is extremely difficult to counterfeit a color image made of a combination of non-fluorescent and fluorescent inks.

The combination of dither functions comprising artistic screen shapes and primary colors comprising non-standard inks offers therefore a variety of strong anti-counterfeiting protection means.

Multi-Color Dithering for Side by Side Printing

Some applications require that different inks be always printed side by side without overlapping. This is for example the case when printing with opaque inks as taught by inventor H. Kueppers in U.S. Pat. No. 4,812,899, issued Mar. 14, 1989. Different inks must also be printed side by side for some printing devices as taught by J. Gereadts and S. Lenczowski, "Océ's productive colour solution based on the Direct Imaging Technology", Proceedings IS&T International Conf. On Direct Imaging Technology, Vol. NIP-13, 1997, pages 728–733. In these cases, no superimpositions of inks are allowed. The chosen set of inks plus the color of the substrate (generally paper white) forms the set of primary colors. By construction, multi-color dithering ensures that all primary colors are printed side by side. Theferore multi-color dithering offers a solution for printing on printers requiring side by side printing of primary colors.

Apparatus and Computing System for Multi-Color Dithering

An apparatus for color image reproduction by multi-color dithering is shown in FIG. 1.

An input color image storage unit 110 stores an input color image made of input color image pixels of color C(x',y').

A neighborhood calculation unit 120 is operable for computing a subset of primary colors $\{C_j\}$ neighbors of a given input image color C and for computing for each neighbor color $C_j$ of the set $\{C_j\}$ a signal $S_j(x,y)$ giving the relative normalized amount of $C_j$ in respect to input image color C. The preferred embodiment of the neighborhood calculation unit is a tetrahedral calculation unit operable for computing and maintaining a subdivision of the color working space ABC into a set of tetrahedra, operable for applying the interior membership test and operable for computing from an input image color C and from primary colors $C_1$, $C_2, C_3, C_4$ forming the vertices of the tetraheder selected by the interior membership test the signals $S_1(x,y)$, $S_2(x,y)$, $S_3(x,y)$ and $S_4(x,y)$ giving the relative normalized amounts of primary colors $C_1$, $C_2, C_3, C_4$.

A dither function storage unit 160 stores the values of a two-dimensional dither function $G(x,y)$.

A multi-color dithering unit 130 is operable for sweeping through all pixels of the output image (x,y), operable for finding the input color $C(x',y')$ at the corresponding input image loation (x',y'), operable for launching the neighborhood calculation unit to compute a subset of primary colors $\{C_j\}$ neighbors of $C(x',y')$ as well as their respective normalized amounts expressed as signals $\{S_j(x,y)\}$, and operable for determining the partition $P_j(x,y)$ within which the dither function $G(x,y)$ stored in the dither function storage unit 160 is situated, thereby selecting the primary color $C_j(x,y)$ associated to $P_j(x,y)$ as output color $O(x,y)$. Upper and lower boundaries of partitions $P_1$, $P_2$, ... PN are respectively defined by lower boundary 0 and upper boundary $S_1(x,y)$, lower boundary $S_1(x,y)$ and upper boundary $S_1(x,y)+S_2(x,y)$, ..., lower boundary $S_1(x,y)+S_2(x,y)+...+S_{N-1}(x,y)$ and upper boundary $S_1(x,y)+S_2(X\ Y)+...+S_N(x,y)$, where N is the number of colors of the computed subset of primary colors $\{C_j\}$, i.e. the number of primary colors contributing to render input color $C(x',y')$.

In the case that the neighborhood calculation unit is embodied by a tetrahedral calculation unit, launching the neighborhood calculation unit to compute a subset of primary colors $\{C_j\}$ neighbors of $C(x',y')$ as well as their respective input signals $\{S_j(x,y)\}$ consists in requiring the tetrahedral calculation unit to find the tetrahedron containing the input image color C and in computing signals $S_1(x,y)$, $S_2(x,y)$, $S_3(x,y)$ and $S_4(x,y)$ representing the relative normalized amounts of colors $C_1$, $C_2$, $C_3$ and $C_4$. Finding the tetrahedron containing the input image color C can be achieved by an interior membership test.

An output multi-color image storage unit 140 is operable for storing for each output image pixel (x,y) the selected primary color. The output multi-color image storage unit 140 may comprise a pixmap storing the code of the selected primary color $O(x,y)$ resulting from the operations of the multi-color dithering unit. Each member of the set $\{C_i\}$ of n primary colors $C_0$ to $C_{n-1}$ can be coded as a binary number ranging between 0 and n−1. Alternatively, the output multi-color image storage unit may comprise a multilayer bitmap with one bit per primary color, storing for all non selected primary colors a value of 0 and a value of 1 for the selected primary color $O(x,y)$. The output multi-color image storage unit is also operable for forwarding the resulting output multi-color image to an output device 150.

The output device is operable for converting the output multi-color image into a visible color image, for example a color image displayed by a color display or a color image printed by a color printer.

With modern technology, the storage and computing elements as well as the output device which are part of the apparatus can be implemented by a computing system (FIG. 1B). The input color image storage unit 110, the dither function storage unit 160 and the output multi-color image storage unit 140 are all part of the computing system's memory 170. The functions of the neighborhood (tetrahedral) calculation unit and the multi-color dithering unit are implemented by respectively a neighborhood (tetrahedral) calculation software procedure and a multi-color dithering software procedure stored in the computer system's memory and running on the computing system's central processing unit 180 which interacts with said memory for fetching program instructions and for reading and writing data.

The computing system comprises therefore a memory operable for storing an input color image made of input color image pixels $C(x'y')$, operable for storing the values of a two-dimensional dither function $G(x,y)$, operable for storing the code of a neighborhood calculation software procedure, operable for storing a multi-color dithering software procedure and operable for storing an output multi-color dithered image $O(x,y)$. The computing system also comprises a central processing unit interacting with said memory and running said neighborhood calculation and multi-color dithering software procedures, operable for computing for each output multi-color image pixel an output primary color $O(x,y)$ selected from a set of primary colors, operable for storing the output primary color $O(x,y)$ in memory and operable for forwarding the resulting output multi-color dithered image to an output device. The computing system also comprises an output device operable for converting the output multi-color image into a visible color image.

The preferred embodiment of the neighborhood calculation software procedure is a tetrahedral calculation software procedure. This procedure computes and maintains a subdivision of the color working space into a set of tetrahedra, applies an interior membership test and computes from an input image color C and from primary colors $C_1$, $C_2, C_3, C_4$ forming the vertices of the tetrahedron selected by the interior membership test the signals $S_1(x,y)$, $S_2(x,y)$, $S_3(x,y)$ and $S_4(x,y)$ giving the relative normalized amounts of primary colors $C_1$, $C_2$, $C_3$, $C_4$. The multi-color dithering software procedure sweeps through all pixels (x,y) of the output image, finds corresponding input image pixel colors $C(x',y')$, calls the tetrahedral calculation software procedure to find the tetrahedron T containing the input image color C and to compute the signals $S_1(x,y)$, $S_2(x,y)$, $S_3(x,y)$ and $S_4(x,y)$, determines the partition $P_j(x,y)$ whithin which the two-dimensional dither function $G(x,y)$ is situated and selects the primary color $C_j(x,y)$ associated to $P_j(x,y)$ as output color $O(x,y)$.

ADVANTAGES

Figure 27:
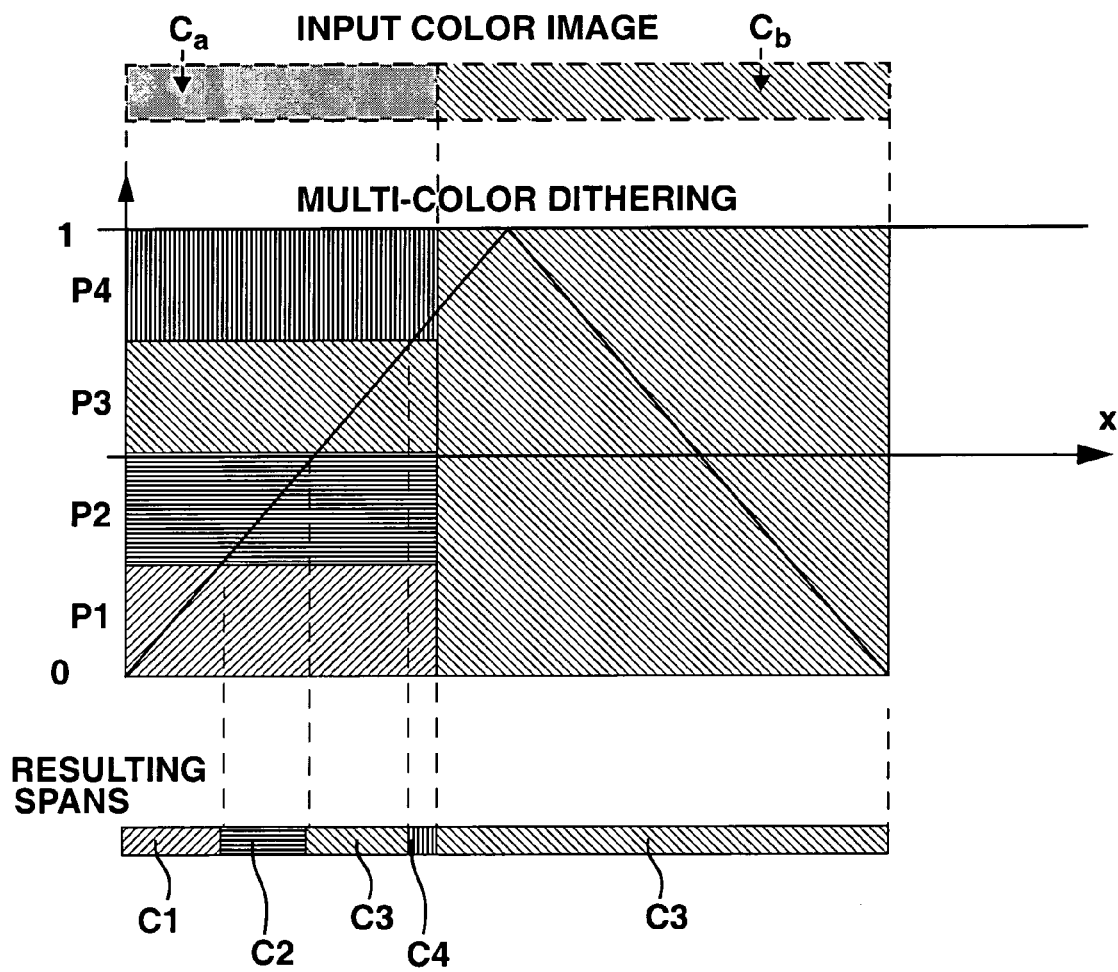
FIG. 27 shows the application of the multi-color dithering method to an input image having a sharp transition from a uniform color $C_a$ to a uniform color $C_b$.

The invented multi-color dithering method is extremely flexible: it accommodates the use of a freely chosen set of primary colors (standard and non-standard inks) and the use of a freely designed dither function having any desired size. One may create either small repetitive dither functions (respectively dither arrays) or large dither functions (dither arrays), up to dither functions (dither arrays) covering the whole surface of the output image. With large dither arrays, one can easily generate identifyable screen shapes, for example artistic screen shapes (FIGS. 11–26). Such artistic screen shapes provide additional document authentication means. The invented multi-color method allows to reproduce original picture edges with the highest possible fidelity, thanks to the fact that at each output pixel, (1) the unit interval is partitioned into as many partitions as contributing primary colors and (2) in order to select the output image pixel's primary color, the partition within which the dither function is situated is determined. FIG. 27 gives an example where the input image consists of uniform color $C_a$ followed by a sharp transition to color $C_b$. Input image color $C_a$ is to be reproduced by the following amounts of primary colors: 25% C1, 25% C2, 25% C3 and 25% C4. Input image color $C_b$ is identical to primary color C3. One may verify that exactly starting from the point of transition between $C_a$ and $C_b$, the dither function G(x) is located in partition P3 and that therefore color C3 is selected as output primary color.

What is claimed is:

1. A multi-color dithering method for the reproduction of color input images, the method being characterized by the use of a two-dimensional dither function, the use of an arbitrary number of primary colors and the use of partitions representing relative amounts of primary colors, the method comprising the steps of:
   (a) defining a two dimensional dither function $G(x,y)$;
   (b) choosing a set of primary colors $\{C_i\}$ located within a three-dimensional color working space ABC;
   (c) initiating a neighbor finding procedure which renders neighboring primary colors $\{C_j\}$ of a given input color C in the three-dimensional color space ABC;
   (d) computing the primary color of each output image pixel $O(x,y)$ by a set of substeps comprising:
      (i) locating in the input color image an input color location $(x',y')$ associated to the output image pixel $O(x,y)$ and computing its corresponding color $C(x',y')$;
      (ii) finding N neighbor primary colors $\{C_j\}$ of C in the ABC color space by using the neighbor finding procedure;
      (iii) computing the amount $S_j(x,y)$ of every neighbor primary color C1;
      (iv) determining the output primary color $O(x,y)$ at output pixel $(x,y)$ by locating at each position $(x,y)$ a partition $P_j(x,y)$ within which the dither function $G(x,y)$ is situated, where upper and lower boundaries of partitions $P_1, P_2, \ldots PN$ are respectively defined by lower boundary 0 and upper boundary $S_1(x,y)$, lower boundary $S_1(x,y)$ and upper boundary $S_1(x,y)+S_2(x,y), \ldots$, lower boundary $S_1(x,y)+S_2(x,y)+ \ldots +S_{N-1}(x,y)$ and upper boundary $S_1(x,y)+S_2(x,y)+ \ldots +S_N(x,y)$, and by assigning to the output primary color $O(x,y)$ the neighbor primary color $C_j$ associated to partition $P_j(x,y)$; and
   (e) outputting the multi-color dithered output image on an output device.

2. The method of claim 1, where the dither function is a two-dimensional discrete dither function characterized by two basic translation vectors.

3. The method of claim 2, where the two-dimensional discrete dither function is obtained by discretizing a continuous dither function.

4. The method of claim 2, where the discrete values of the two-dimensional discrete dither function are obtained by incrementing ordinal numbers along a space-filling curve.

5. The method of claim 1, where outputting the multi-color dithered output image consists in printing the multi-color dithered output image.

6. The method of claim 1, where outputting the multi-color dithered output image consists in displaying the multi-color dithered output image on a color display.

7. The method of claim 1, where the chosen set of primary colors $\{C_i\}$ comprises non-standard inks selected from the set comprising transparent non process color inks, opaque inks, metallic inks, variable color inks and fluorescent inks.

8. The method of claim 7, where the non-standard inks are opaque inks, where the original multi-colored dithered image is prepared at a resolution of R dots/inch and printed at a resolution $R_p \geq R$ with a registration accuracy $u_a \geq 1/(2R)$ inch, thereby offering an effective anti-counterfeiting protection, since counterfeiting with printing devices of registration accuracy $u_a < 1/R$ inch yields ink overlaps resulting in strong color shifts.

9. The method of claim 1, where the dither function is a large dither array incorporating artistic screen shapes and where the chosen set of primary colors $\{C_i\}$ comprises at least one fluorescent ink which under illumination with UV light reveals the artistic screen shapes present in the multi-color dithered output image.

10. The method of claim 1, where the dither function is a large dither array incorporating artistic screen shapes and where preparing the image at a high resolution of R dots/inch and printing it at a resolution $R_p \geq R$ makes it impossible to reproduce the multi-colored dithered image on a copier with a resolution lower than R without heavy degradation of the artistic screen shapes.

11. The method of claim 1, where the chosen set of primary colors $\{C_i\}$ is identical to the chosen set of inks plus the color of the substrate thereby fulfilling the requirement of printers requiring that inks are always printed side by side.

12. The methods of claim 1, where the neighbor finding procedure uses a subdivision of the color working space ABC into a set of tetrahedra $\{T_k\}$ having as vertices the chosen set of selected primary colors $\{C_i\}$, where the neighbor finding procedure comprises the step of applying to the set of tetrahedra an interior membership test, thereby obtaining tetrahedron T containing input color $C(x',y')$ and where for every neighbor primary color $C_j$ the computation of their relative amounts $S_j(x, y)$ comprises the step of finding ratios between the Euclidian distances from the input color $C(x',y')$ to faces of the tetrahedron T and the corresponding Euclidean distances from the same tetrahedron's faces to their opposite vertices.

13. An apparatus for color image reproduction by multi-color dithering comprising:
   (a) an input color image storage unit operable for storing an input color image made of input color image pixels of color $C(x',y')$;
   (b) a neighborhood calculation unit operable for computing a subset of primary colors $\{C_j\}$ neighbors of the given input image color C and operable for computing for each neighbor color $C_j$ of the set $\{C_j\}$ a signal $S_j(x,y)$ giving the relative amount of $C_j$ in respect to input image color C;
   (c) a dither function storage unit storing the values of a two-dimensional dither function $G(x,y)$;
   (d) a multi-color dithering unit operable for sweeping through all pixels of the output image $(x,y)$, operable for finding the input color $C(x',y')$ of corresponding input image pixels, operable for launching the neighborhood calculation unit to compute a subset of primary colors $\{C_j\}$ neighbors of $C(x',y')$ as well as their respective signals $\{S_j(x,y)\}$, operable for determining a partition $P_j(x,y)$ within which the dither function $G(x,y)$ stored in the dither function storage unit 160 is situated, thereby selecting the primary color $C_j(x,y)$ associated to $P_j(x,y)$ as output color $O(x,y)$;
   (e) an output multi-color image storage unit operable for storing the selected primary colors $O(x,y)$ generated by the multi-color dithering unit and operable for forwarding the primary colors making up the output multi-color dithered image to an output device;
   (f) an output device operable for converting the output multi-color dithered image into a visible color image.

14. The apparatus of claim 13, where the neighborhood calculation unit is a tetrahedral calculation unit operable for computing and maintaining a subdivision of the color working space into a set of tetrahedra, operable for applying the interior membership test and operable for computing from an input image color C and from primary colors $C_1, C_2, C_3, C_4$ forming the vertices of the tetrahedron selected by the interior membership test the signals $S_1(x,y)$, $S_2(x,y)$, $S_3(x,y)$, $S_4(x,y)$ giving the relative amounts of primary colors $C_1$, $C_2$, $C_3$, $C_4$.

15. A computing system for multi-color dithering comprising (a) a memory operable for storing an input color image made of input color image pixels $C(x'y')$, operable for storing the values of a two-dimensional dither function $G(x,y)$, operable for storing the code of a neighborhood calculation software procedure, operable for storing a multi-color dithering software procedure and operable for storing an output multi-color dithered image $O(x,y)$;

(b) a central processing unit interacting with said memory and running said neighborhood calculation and multi-color dithering software procedures, operable for computing for each output image pixel (x,y) an output primary color $O(x,y)$ selected from a set of primary colors, operable for storing the output primary color $O(x,y)$ in memory and operable for forwarding the resulting output multi-color dithered image to an output device;

(c) an output device operable for converting the output multi-color image into a visible color image, where the multi-color dithering software procedure sweeps through output image pixels, finds for each output image pixel (x,y) a corresponding input image pixel color $C(x',y')$, launches the neighborhood calculation software procedure which computes a subset of primary colors $\{C_j\}$ neighbors of $C(x',y')$ as well as their respective amounts $\{S_j(x,y)\}$, determines a partition $P_j(x,y)$ within which the two-dimensional dither function $G(x,y)$ is situated and selects a primary color $C_j(x,y)$ associated to $P_j(x,y)$ as output primary color $O(x,y)$.

16. The computing system of claim 15, where the neighborhood calculation software procedure is a tetrahedral calculation software procedure which computes and maintains a subdivision of the color working space into a set of tetrahedra, applies an interior membership test and computes from an input image color C and from primary colors $C_1$, $C_2$, $C_3$, $C_4$ forming the vertices of the tetrahedron selected by the interior membership test the relative amounts $S_1(x,y)$, $S_2(x,y)$, $S_3(x,y)$ and $S_4(x,y)$ of primary colors $C_1$, $C_2$, $C_3$, $C_4$.

* * * * *